US012190157B2

(12) United States Patent
Seo et al.

(10) Patent No.: US 12,190,157 B2
(45) Date of Patent: Jan. 7, 2025

(54) METHODS, SYSTEMS, AND APPARATUSES FOR SCALABLE PORT-BINDING FOR ASYMMETRIC EXECUTION PORTS AND ALLOCATION WIDTHS OF A PROCESSOR

(71) Applicant: Intel Corporation, Santa Clara, CA (US)

(72) Inventors: Daeho Seo, Austin, TX (US); Vikash Agarwal, Austin, TX (US); John Esper, Austin, TX (US); Khary Alexander, Cedar Park, TX (US); Asavari Paranjape, Austin, TX (US); Jonathan Combs, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 869 days.

(21) Appl. No.: 17/033,739

(22) Filed: Sep. 26, 2020

(65) Prior Publication Data

US 2022/0100569 A1    Mar. 31, 2022

(51) Int. Cl.
*G06F 9/46*    (2006.01)
*G06F 9/30*    (2018.01)
*G06F 9/50*    (2006.01)

(52) U.S. Cl.
CPC ........ *G06F 9/5027* (2013.01); *G06F 9/30145* (2013.01)

(58) Field of Classification Search
CPC .............................. G06F 9/5027; G06F 9/30145
See application file for complete search history.

(56) References Cited

U.S. PATENT DOCUMENTS

2015/0007188 A1* 1/2015 Sutanto .................. G06F 9/384
                                                      718/104
2021/0089317 A1* 3/2021 Liu ....................... G06F 9/3836

* cited by examiner

*Primary Examiner* — Tammy E Lee
(74) *Attorney, Agent, or Firm* — NICHOLSON DE VOS WEBSTER & ELLIOTT LLP

(57) ABSTRACT

Systems, methods, and apparatuses relating to circuitry to implement scalable port-binding for asymmetric execution ports and allocation widths of a processor are described. In one embodiment, a hardware processor core includes a decoder circuit to decode instructions into sets of one or more micro-operations, an instruction decode queue to store the sets of one or more micro-operations, a plurality of different types of execution circuits that each comprise a respective input port and a respective input queue, and an allocation circuit comprising a plurality of allocation lanes coupled to the instruction decode queue and to the input ports of the plurality of different types of execution circuits, wherein the allocation circuit is to, for an input of micro-operations on the plurality of allocation lanes, generate a sorted list of occupancy of the input queues of each input port, generate a pre-binding mapping of the input ports of the plurality of different types of execution circuits to the plurality of allocation lanes in a circular order according to the sorted list, when a type of micro-operation from an allocation lane does not match a type of execution circuit of an input port in the pre-binding mapping, slide the pre-binding mapping so that the input port maps to a next allocation lane having a matching type of micro-operation to generate a final mapping of the input ports of the plurality of different types of execution circuits to the plurality of allocation lanes, and bind the input ports of the plurality of different types of execution circuits to the plurality of allocation lanes according to the final mapping.

24 Claims, 19 Drawing Sheets

| Lane 602 | Pre-binding 604 | Notes: |
|---|---|---|
| 0 | P2 | |
| 1 | P0 | |
| 2 | P1 | |
| 3 | P3 | |
| 4 | P2 | Re-start the order from the beginning |
| 5 | P0 | |

| Lane 702 | μOP Type 704 | Pre-binding 706 | Actual binding 708 | Notes: |
|---|---|---|---|---|
| 0 | INT | P2 | P2 | |
| 1 | FP | P0 | X | Slide because FP is not the target type (INT) |
| 2 | INT | P1 | P0 | |
| 3 | MEC | P3 | X | Slide because MEC is not the target type (INT) |
| 4 | INT | P2 | P1 | |
| 5 | INT | P0 | P3 | |

| Lane 802 | µOP Type 804 | Pre-binding 806 | Actual binding 808 | Notes: |
|---|---|---|---|---|
| 0 | INT | P6 | X | Slide because INT is not the target type (MEC) |
| 1 | FP | P4 | X | Slide because FP is not the target type (MEC) |
| 2 | INT | P5 | X | Slide because INT is not the target type (MEC) |
| 3 | MEC | P6 | P6 | |
| 4 | INT | P4 | X | Slide because INT is not the target type (MEC) |
| 5 | INT | P5 | X | Slide because INT is not the target type (MEC) |

```
┌─────────────────────────────────────────────────────────────────────────┐
│ DECODING INSTRUCTIONS INTO SETS OF ONE OR MORE MICRO-OPERATIONS WITH ONE│
│ OR MORE DECODER CIRCUITS OF A PROCESSOR COMPRISING A PLURALITY OF       │
│ DIFFERENT TYPES OF EXECUTION CIRCUITS THAT EACH COMPRISE A RESPECTIVE   │
│ INPUT PORT AND A RESPECTIVE INPUT QUEUE                                 │
│ 1102                                                                    │
└─────────────────────────────────────────────────────────────────────────┘
                                    ▼
┌─────────────────────────────────────────────────────────────────────────┐
│ SENDING A SECOND BLOCK OF INSTRUCTIONS YOUNGER IN PROGRAM ORDER THAN    │
│ THE FIRST BLOCK OF INSTRUCTIONS TO A SECOND DECODE CLUSTER COMPRISING A │
│ PLURALITY OF DECODER CIRCUITS OF THE PROCESSOR FOR DECODING             │
│ 1104                                                                    │
└─────────────────────────────────────────────────────────────────────────┘
                                    ▼
┌─────────────────────────────────────────────────────────────────────────┐
│ GENERATING, BY THE ALLOCATION CIRCUIT, A SORTED LIST OF OCCUPANCY OF THE│
│ INPUT QUEUES OF EACH INPUT PORT                                         │
│ 1106                                                                    │
└─────────────────────────────────────────────────────────────────────────┘
                                    ▼
┌─────────────────────────────────────────────────────────────────────────┐
│ GENERATING, BY THE ALLOCATION CIRCUIT, A PRE-BINDING MAPPING OF THE     │
│ INPUT PORTS OF THE PLURALITY OF DIFFERENT TYPES OF EXECUTION CIRCUITS   │
│ TO THE PLURALITY OF ALLOCATION LANES IN A CIRCULAR ORDER ACCORDING      │
│ TO THE SORTED LIST                                                      │
│ 1108                                                                    │
└─────────────────────────────────────────────────────────────────────────┘
                                    ▼
┌─────────────────────────────────────────────────────────────────────────┐
│ SLIDING, BY THE ALLOCATION CIRCUIT WHEN A TYPE OF MICRO-OPERATION FROM AN│
│ ALLOCATION LANE DOES NOT MATCH A TYPE OF EXECUTION CIRCUIT OF AN INPUT  │
│ PORT IN THE PRE-BINDING MAPPING, THE PRE-BINDING MAPPING SO THAT THE INPUT│
│ PORT MAPS TO A NEXT ALLOCATION LANE HAVING A MATCHING TYPE OF MICRO-    │
│ OPERATION TO GENERATE A FINAL MAPPING OF THE INPUT PORTS OF THE         │
│ PLURALITY OF DIFFERENT TYPES OF EXECUTION CIRCUITS TO THE PLURALITY OF  │
│ ALLOCATION LANES                                                        │
│ 1110                                                                    │
└─────────────────────────────────────────────────────────────────────────┘
                                    ▼
┌─────────────────────────────────────────────────────────────────────────┐
│ BINDING, BY THE ALLOCATION CIRCUIT, THE INPUT PORTS OF THE PLURALITY OF │
│ DIFFERENT TYPES OF EXECUTION CIRCUITS TO THE PLURALITY OF ALLOCATION    │
│ LANES ACCORDING TO THE FINAL MAPPING                                    │
│ 1112                                                                    │
└─────────────────────────────────────────────────────────────────────────┘
```

FIG. 11

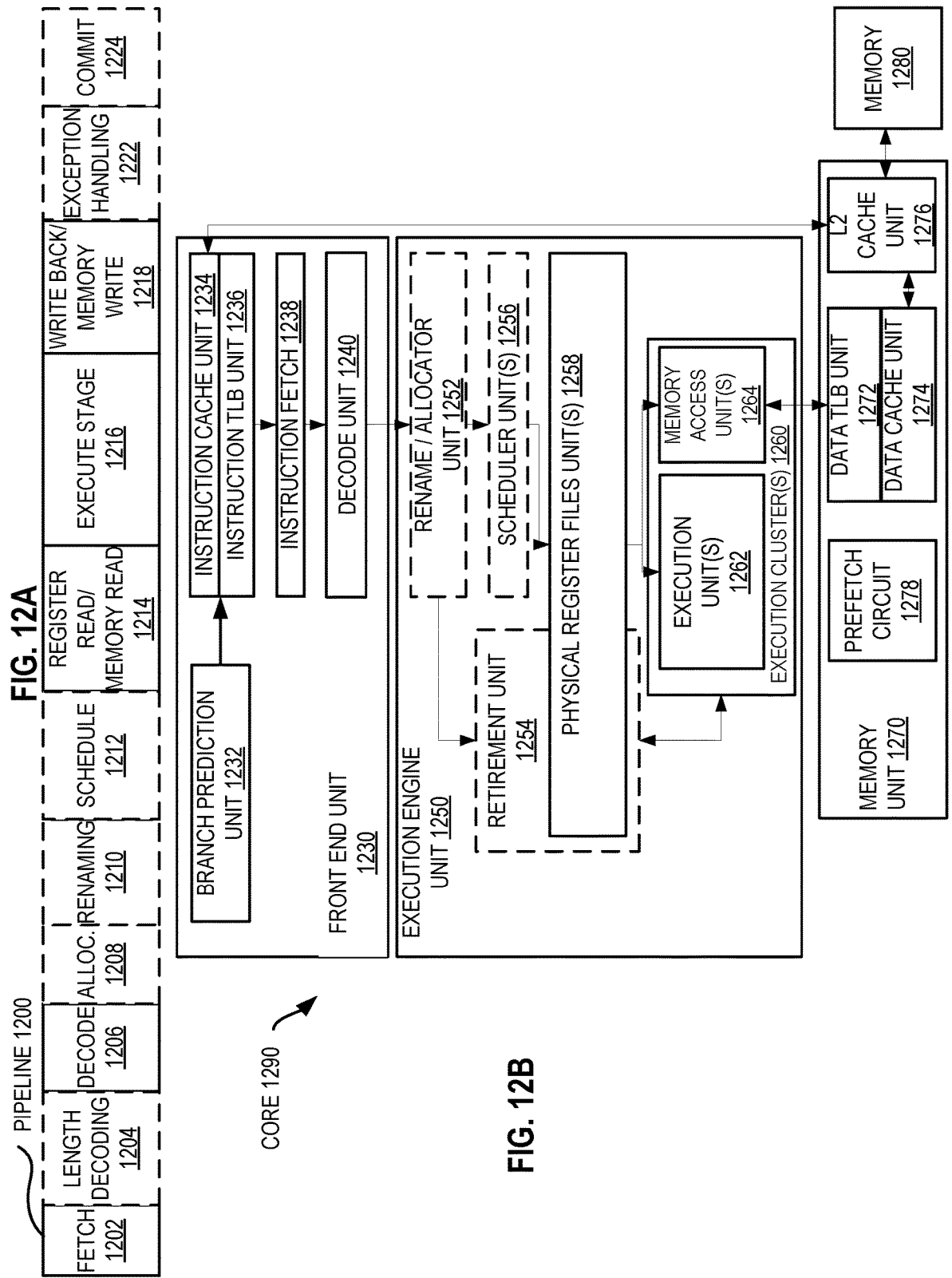

METHODS, SYSTEMS, AND APPARATUSES FOR SCALABLE PORT-BINDING FOR ASYMMETRIC EXECUTION PORTS AND ALLOCATION WIDTHS OF A PROCESSOR

TECHNICAL FIELD

The disclosure relates generally to electronics, and, more specifically, an embodiment of the disclosure relates to circuitry to implement scalable port-binding for asymmetric execution ports and allocation widths of a processor.

BACKGROUND

A processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (I/O). It should be noted that the term instruction herein may refer to a macro-instruction, e.g., an instruction that is provided to the processor for execution, or to a micro-instruction, e.g., an instruction that results from a processor's decoder decoding macro-instructions.

BRIEF DESCRIPTION OF THE DRAWINGS

The present disclosure is illustrated by way of example and not limitation in the figures of the accompanying drawings, in which like references indicate similar elements and in which:

FIG. 8 illustrates sliding of pre-binding mapping of a second set of (e.g., memory execution circuit) ports to allocation lanes into a final (e.g., actual) mapping according to embodiments of the disclosure.

FIG. 11 is a flow diagram illustrating operations for binding ports of execution circuits to allocation lanes according to embodiments of the disclosure.

FIG. 12A is a block diagram illustrating both an exemplary in-order pipeline and an exemplary register renaming, out-of-order issue/execution pipeline according to embodiments of the disclosure.

FIG. 12B is a block diagram illustrating both an exemplary embodiment of an in-order architecture core and an exemplary register renaming, out-of-order issue/execution architecture core to be included in a processor according to embodiments of the disclosure.

DETAILED DESCRIPTION

Figure 1:
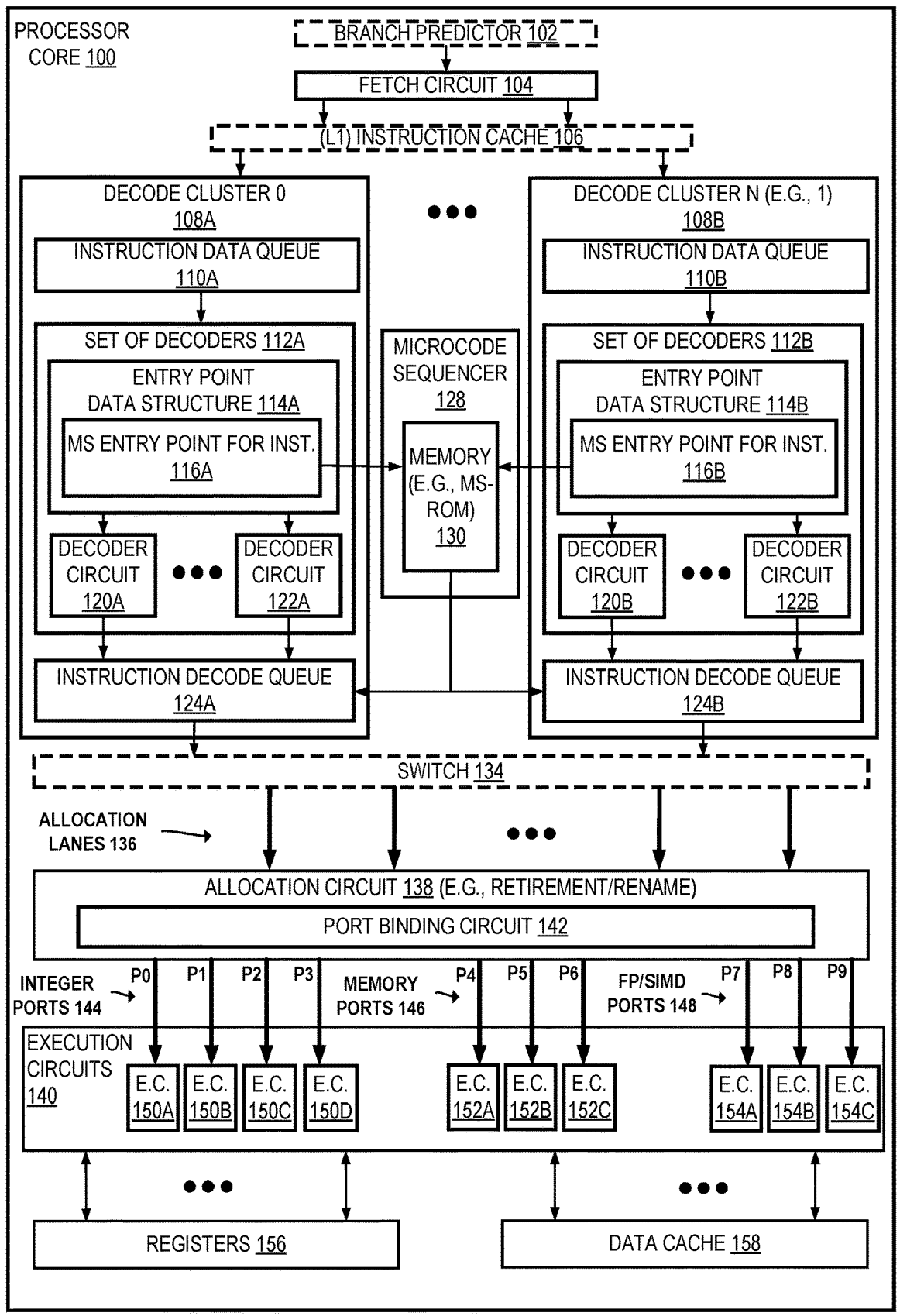
FIG. 1 illustrates a processor core having an allocation circuit comprising a port binding circuit and a plurality of execution circuits according to embodiments of the disclosure.

In the following description, numerous specific details are set forth. However, it is understood that embodiments of the disclosure may be practiced without these specific details. In other instances, well-known circuits, structures, and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

A (e.g., hardware) processor (e.g., having one or more cores) may execute (e.g., user-level) instructions (e.g., a thread of instructions) to operate on data, for example, to perform arithmetic, logic, or other functions. For example, software may include a plurality of instructions (e.g., macro-instructions) that are provided to a processor (e.g., a core or cores thereof) that then executes (e.g., decodes and executes) the plurality of instructions to perform the corresponding operations. In certain embodiments, a processor includes circuitry (e.g., one or more decoder circuits) to translate (e.g., decode) an instruction into one or more micro-operations (µops or micro-ops), for example, with these micro-operations directly executed by the hardware (e.g., by execution circuits). One or more micro-operations corresponding to an instruction (e.g., macro-instruction) may be referred to as a microcode flow for that instruction. A micro-operation may be referred to as a micro-instruction, for example, a micro-instruction that resulted from a processor's decoding of a macro-instruction. In one embodiment, the instructions are 64 bit and/or 32 bit instructions of an instruction set architecture (ISA). In one embodiment, the instructions are (e.g., 64 bit and/or 32 bit) instructions of an Intel® instruction set architecture (ISA). In certain embodiments, the translation of an instruction into one or more micro-operations is associated with the instruction fetch and/or decode portion of a processor's pipeline.

In certain processors, the operations (e.g., micro-operations) that are to be executed are scheduled for execution by a circuit (e.g., allocation circuit) that allocates execution resources for the operations. An allocation circuit may be part of scheduler circuitry of a processor. In certain embodiments, an allocation circuit is responsible for (i) tracking the dependency chain of micro-operations (µops) and/or (ii) (e.g., optimally) scheduling the micro-operations (µops) across execution ports based on each port's functionality.

In certain embodiments, for the allocation circuit to schedule micro-operations (µops) optimally, it is to know all the micro-operations (µops) which are ready to be scheduled (e.g., each cycle) and then apply the best scheduling option so that it can maximize the execution pipeline (e.g., execution ports) usage. In certain embodiments, this dynamic scheduling by the allocation circuit is very hardware intensive and timing critical, and is not scalable with increase in execution pipelines (e.g., ports) and limits it to being a unified structure. To solve this issue and get rid of the dynamic execution pipeline (e.g., port) selection, another option is to bind the micro-operations (µops) to specific execution ports early in the pipeline such that the allocation circuit only picks among the micro-operations (µops) which are bound to specific pipelines, e.g., making the job of the allocation circuit focused on tracking the dependency chain and scheduling them to the specified port. This may be referred to as port-binding, for example, but with the tradeoff for port-binding being performance, e.g., how close can the port binding scheme mimic a dynamic scheduling. Port-binding may be performed at allocation, e.g., where the allocation circuit (e.g., allocation pipeline) knows the type of each micro-operation (µop) and which execution pipeline (e.g., port) they can execute on.

In certain embodiments, an allocation scheme is to allocate micro-operations (µops) to the least occupied input port(s) of the execution circuits (e.g., based on port occupancy data). In certain embodiments, an allocation scheme is to allocate micro-operations (µops) to the input port(s) of the execution circuits in a circular order (e.g., "round-robin") (e.g., and not based on port occupancy data). Both schemes have their own pitfalls. For example, allocating to the least occupied may work when there are few (e.g., narrow) execution and allocation pipelines, e.g., where for each allocation cycle, the allocation circuit attempts to push all micro-operations (µops) that are being scheduled to the least occupied port(s). However, in such embodiments the allocation circuit may not know if the other ports have nothing to schedule or any occupancy information about them (e.g., and is not scalable for micro-architectures that have more allocation lanes and more execution pipelines). Such embodiments may cause temporally unbalanced workload distribution to execution pipelines (e.g., ports), and hence do not use the execution pipelines (e.g., ports) efficiently. For example, circular order allocation (e.g., "round-robin") attempts to distribute work evenly, but may not consider the drain rate of a port and hence does not have visibility into how the dependency chain resolves, e.g., leading to un-optimal use of execution pipelines (e.g., ports) which leads to performance degradation.

Certain embodiments herein utilize a single allocation scheme that improves on the two schemes described above, e.g., a single allocation scheme that is scalable with allocation width and improves the execution pipeline (e.g., port) usage leading to much higher performance. Certain embodiments herein utilize a single allocation scheme (e.g., for port binding or port affinity) that utilizes port occupancy information, circular order allocation, and sliding.

In certain embodiments of the single allocation scheme, port occupancy information is a pre-sorted list of execution ports created based on occupancy. In one embodiment, while sorting, certain heuristics are applied in order to mask certain ports and/or allocate all operations to a specific (e.g., single) port. The port occupancy information can be stale allowing the sorting and masking to be distributed across one or more cycles to reduce timing criticality.

In certain embodiments of the single allocation scheme, the pre-sorted list is then pre-mapped to the allocation lanes in a circular order (e.g., "round-robin" fashion), e.g., so that each allocation lane has a pre-assigned port number.

In certain embodiments of the single allocation scheme, during allocation, this pre-sorted list is used for binding if the type of micro-operation (µop) to-be-allocated matches the type of port (e.g., type of execution circuit that port corresponds to), and if it does not, the allocation circuit is to slide the pre-sorted information to the next allocation lane, e.g., based on some heuristics. For example, to ensure that the sorting information is not lost and hence is able to balance work across execution ports (for example, binding for integer port slides for memory-related micro-operations (µops) and/or floating point micro-operation (µops)). Embodiments here thus provide a solution for two critical problems by (i) providing scalability of port-binding with increasing allocation width (e.g., the number of allocation lanes), e.g., making such a port-binding implementable and scalable in hardware and (ii) balancing work with the growing number of execution ports (e.g., asymmetric ports, static (e.g., bound to a single execution port), partial dynamic (e.g., a proper subset of execution ports), and full dynamic (e.g., all execution ports)) which leads to performance improvement.

FIG. 1 illustrates a processor core 100 having an allocation circuit 138 comprising a port binding circuit 142 and a plurality of execution circuits 140 according to embodiments of the disclosure. The plurality of execution circuits 140 may include a plurality of different types of execution circuits, for example, integer type of execution circuit(s) (e.g., as discussed in reference to FIG. 2), memory type of execution circuit(s) (e.g., as discussed in reference to FIG. 3), floating point type of execution circuit(s) (e.g., as discussed in reference to FIG. 4), single instruction multiple data (SIMD) (e.g., vector) type of execution circuit(s) (e.g., as discussed in reference to FIG. 4), or any combination thereof. Execution circuits 140 may include (i) a set of one or more integer type of execution circuits 150A, 150B, 150C, and 150D having corresponding integer ports 144 (labeled ports P0, P1, P2, and P3, respectively) (although shown as having four ports and four corresponding execution circuits of this type, any single or plurality may be utilized in certain embodiments), (ii) a set of one or more memory type of execution circuits 152A, 152B, and 152C, having corresponding memory ports 146 (labeled ports P4, P5, and P6, respectively) (although shown as having three ports and three corresponding execution circuits of this type, any single or plurality may be utilized in certain embodiments), and/or (iii) a set of one or more floating point type and/or SIMD type of execution circuits 154A, 154B, and 154C having corresponding floating point/SIMD ports 148 (labeled ports P7, P8, and P9, respectively) (although shown as having three ports and three corresponding execution circuits of this type, any single or plurality may be utilized in certain embodiments).

Operations to be executed (e.g., micro-operations from decoder circuits 120A-122A and/or decoder circuits 120B-122B) may be sent from allocation lanes 136 (for example, which may be any plurality, e.g., greater than the number of ports, equal to the number of ports, and/or less than the number or ports) to execution circuits 140 via ports 144, 146, and/or 148. In certain embodiments, the number of allocation lanes is referred to as the allocation width, e.g., the number of micro-operations which can be allocated (e.g., from instruction decode queue 124A and/or instruction decode queue 124B).

In certain embodiments, allocation circuit 138 is included to allocate the execution circuits 140 for the incoming micro-operations on allocation lanes 136 (e.g., micro-operations incoming on the allocation lanes 136 in a same (e.g., single) cycle). In certain embodiments, a port binding circuit 142 is included to bind an allocation lane to one or more of the ports of execution circuits 140. Port binding circuit 142 may utilize a (e.g., single) allocation scheme (e.g., for port binding) that utilizes port occupancy information, circular order allocation, and sliding. An example port binding circuit 142 is discussed further in reference to FIG. 5.

Processor core 100 may be one of a plurality of cores of a processor, e.g., of a system. Processor core 100 may include a branch predictor 102 (e.g., to predict one or more branches of the code (e.g., instructions) that are to be executed by the processor core 100. In certain embodiments, the branch predictor 102 (e.g., branch predictor circuit) learns from past behavior of branches to predict a next (e.g., incoming) branch. In certain embodiments, the branch predictor 102 predicts a proper subset of (e.g., contiguous in the original program order) instructions as a block of code (e.g., ending in a branch instruction). As one example, processor core 100 may receive code to execute and, in response, may divide the code into blocks.

In certain embodiments, the processor core 100 (e.g., via the fetch circuit 104 and/or branch predictor 102) may send the blocks of instructions to a decode cluster, for example, with a first block of instructions sent to decode cluster 0 108A, a (next in program order, e.g., younger) second block of instructions sent to decode cluster N 108B, etc. In a two-cluster example, a third (next in program order, e.g., younger) block of instructions may be sent to the next available decode cluster (e.g., after it has finished decoding of its current block of instructions). In a two-cluster example, a third (next in program order, e.g., younger) block of instructions may be sent to the next decode cluster (e.g., to decoder cluster 108A in this example). Although two decode clusters 108A-108B are shown, it should be understood that three or more clusters may be utilized (e.g., where "N" is a positive integer greater than one).

In certain embodiments, each decode cluster includes two or more (e.g., superscalar x86) instruction decoders capable of decoding different basic blocks of code out-of-order with respect to each other, for example, with decode cluster 108A including a first decoder circuit 120A (e.g., decoder) and a second decoder circuit 122A (e.g., decoder), and decode cluster 108B including a second decoder circuit 120B (e.g., decoder) and a second decoder circuit 122B (e.g., decoder).

In certain embodiments, the branch predictor 102 of the processor core 100 divides code into individual blocks (e.g., of a set of contiguous instructions from the program). In certain embodiments, the fetch circuit 104 of the processor core 100 divides code into individual blocks (e.g., of a set of contiguous instructions from the program). The individual code blocks may then be sent to their respective decode cluster for decoding, for example, with the instructions to-be-decoded for each code block stored in a respective instruction data queue (e.g., instruction data queue 110A as an input queue for decode cluster 108A and instruction data queue 110B as an input queue for decode cluster 108B).

Optionally, processor core 100 includes a (e.g., level one) instruction cache 106, e.g., to cache one or more instructions without having to load them from memory. In certain embodiments, fetch circuit 104 sends code blocks to their respective decode cluster via instruction cache 106. Instruction cache 106 may include an instruction cache tag and/or instruction translation lookaside buffer (TLB). In certain embodiments, once the code blocks are sent to their corresponding decode cluster 108A-108B, each decode cluster begins decoding the code blocks in parallel (e.g., via the parallel decoder circuits therein). In certain embodiments, decode clusters operate independently of each other, so the blocks of code can be decoded out-of-order (e.g., out of program order).

In certain embodiments, the allocation circuit 138 is responsible for allocating the operations (e.g., micro-operations) to the execution circuits 140 (e.g., execution units), e.g., in the proper program order.

Processor core depicts a first decode cluster 108A with a plurality of decoder circuits 120A-122A in a first set 112A and a second decode cluster 108B with a plurality of decoder circuits 120B-122B in a second set 112B. In certain embodiments, a (e.g., each) decoder circuit (120A, 122A, 120B, 122B) is to decode a (e.g., macro) instruction into a set of one or more micro-operations that are to be executed (e.g., as a primitive) by an execution circuit(s) 140. In certain embodiments, a decoder circuit (120A, 122A, 120B, 122B) is to decode certain (e.g., macro) instructions into a corresponding set of one or more micro-operations without utilizing a microcode sequencer 128 (e.g., a microcode sequencer separate from any decode cluster and/or decoder circuit) and/or decode other (e.g., macro) instructions (e.g., complex instruction set computer (CISC) instructions) into a corresponding set of one or more micro-operations by utilizing the microcode sequencer 128 (e.g., the microcode sequencer separate from any decode cluster and/or decoder circuit). In one embodiment, a decoder circuit (120A, 122A, 120B, 122B) is to output a certain number of micro-operation per cycle (e.g., one micro-operation per cycle and/or between one and four micro-operations per cycle). In certain embodiments, a "micro-coded" instruction generally refers to an instruction where a decode cluster (e.g., set of decoders) requests the microcode sequencer 128 to load the corresponding set of one or more (e.g., plurality of) micro-operations (μops) from the microcode sequencer memory 130 (e.g., read-only memory (ROM)) into the decode pipeline (e.g., into the corresponding instruction decode queue), e.g., instead of producing that instruction's set of one or more micro-operations directly by a decoder circuit. For example, to implement some (e.g., complex) (e.g., x86) instructions, a microcode sequencer 128 is used to divide the instruction into a sequence of smaller (e.g., micro) operations (also referred to as micro-ops or µops).

In certain embodiments, e.g., due to the nature of x86 and/or the need to build a sequencer of many micro-operations, a microcode sequencer is leveraged for many purposes and results in a structure containing numerous (e.g., tens of thousands of) micro-operations. In certain embodiments, since these sequences of micro-operations require significant amounts of storage (e.g., greater than 100 kilobytes (KB)) the microcode sequencer 128 is physically built as a single (e.g., read) ported memory 130 (e.g., ROM) array, e.g., with the decode clusters sharing this single read port of the microcode sequencer. In certain embodiments, sharing the microcode sequencer 128, instead of duplicating it, is a significant die area savings, e.g., because the area of the microcode sequencer 128 is larger than the area of one of the decode clusters.

Since some (e.g., x86) instructions can map to numerous (e.g., 10s, 100s, etc.) corresponding micro-operations (for example, and some of these sequences require behavior that makes the instructions architecturally serializing, e.g., they force everything older to complete and block anything younger from starting), once a decode cluster transfers control into the microcode sequencer 128, that decode cluster must wait until the micro-operations sequence for that instruction completes (e.g., and the microcode sequencer releases control back to the decode cluster). In certain embodiments, microcode sequencer 128 arbitrates access to a single decode cluster at a time.

In certain embodiments, each decode cluster (e.g., each decoder circuit in some embodiments) includes a data structure to store a corresponding entry point value (e.g., address) for one or more instructions into memory 130 of microcode sequencer 128 and/or a number of bits (e.g., the number of cycles to generate the corresponding micro-operations for an instruction and/or the number of micro-operations for the instruction). For example, (1) with data structure 114A of decode cluster 108A including one or more entries that each indicate (e.g., for a single instruction), an entry point 116A for an instruction and/or (2) with data structure 114B of decode cluster 108B including one or more entries that each indicate (e.g., for a single instruction), an entry point 116B for an instruction. In certain embodiments, data structure 114A and data structure 114B are copies of each other, e.g., they include the same data. In one embodiment, data structure 114A and data structure 114B are loaded with their data at manufacturing time. In one embodiment, data structure 114A and data structure 114B are loaded with their data during processor boot, e.g., by executing Basic Input/Output System (BIOS) firmware or Unified Extensible Firmware Interface (UEFI) firmware.

After decoding of an instruction into its respective micro-operations (e.g., by decoder circuits or microcode sequencer), in certain embodiments they are stored in an instruction decode queue. In FIG. 1 (e.g., at the end of the decode stage), decode cluster 108A includes instruction decode queue 124A (e.g., instruction queue) that receives respective micro-operations from decoder circuits 120A-122A and from microcode sequencer 128 (e.g., when decode cluster 108A is arbitrated access to memory 130) and decode cluster 108B includes instruction decode queue 124B (e.g., instruction queue) that receives respective micro-operations from decoder circuits 120B-122B and from microcode sequencer 128 (e.g., when decode cluster 108B is arbitrated access to memory 130). Optionally, switch 134 is included to couple output(s) of instruction decode queues 124A-124B to allocation lanes 136 (e.g., input(s)) of allocation circuit 138. In certain embodiments, allocation circuit 138 is to send micro-operations from the instruction decode queues 124A-124B (e.g., in program order) to an execution circuit of execution circuits 140. In one embodiment, one or more instruction decode queues are loaded out of program order but read in program order. Certain execution circuits 140 (e.g., memory execution circuits 152A-152B) may access storage, e.g., registers 156 and/or data cache 158 (e.g., one or more levels of a cache hierarchy). Once the resultants are generated by the execution circuits 140, a retirement circuit 138 may then retire a corresponding instruction.

Figure 2:
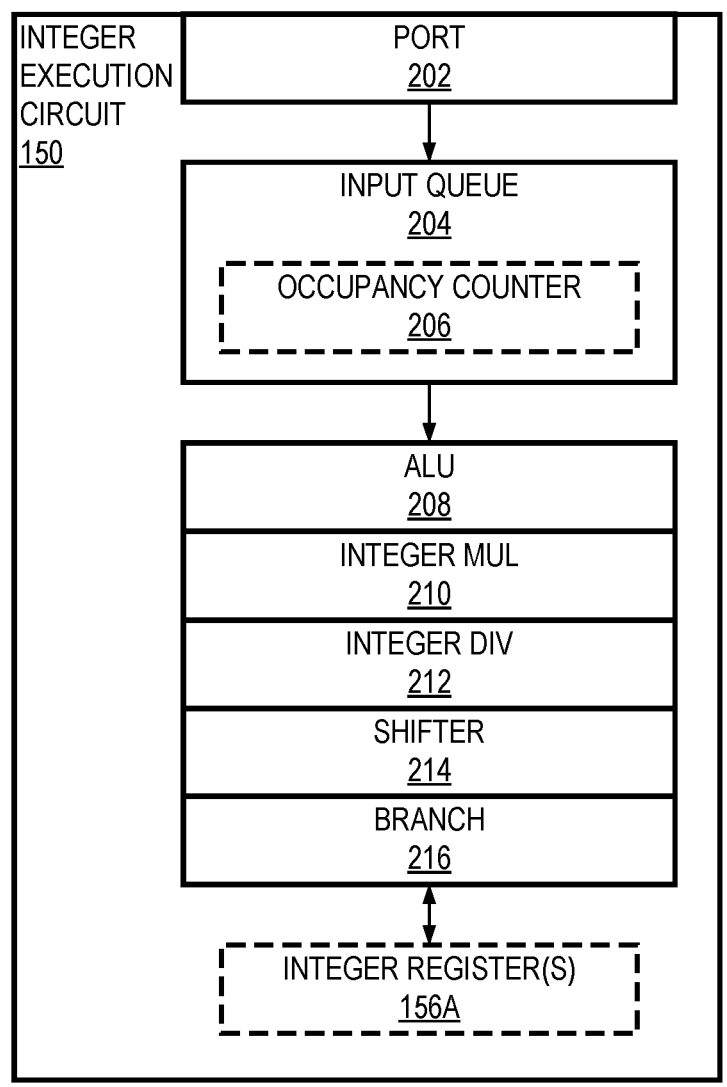
FIG. 2 illustrates an example integer execution circuit according to embodiments of the disclosure.

FIG. 2 illustrates an example integer execution circuit 150 (e.g., as an instance of execution circuits 150A, 150B, 150C, and/or 150D in FIG. 1) according to embodiments of the disclosure. Integer execution circuit 150 includes a (e.g., single) port 202 to receive one (or more) micro-operations to be executed by execution circuitry (e.g., arithmetic logic unit (ALU) 208, integer multiplier 210, integer divider 212, shifter 214, and/or branch 216), e.g., and a coupling to integer register(s) 156A. In certain embodiments, integer execution circuit 150 includes an input queue 204 to store one or more micro-operations that are waiting to be executed, e.g., and an occupancy counter 206 to indicate occupancy (or vacancy) within input queue 204.

Figure 3:
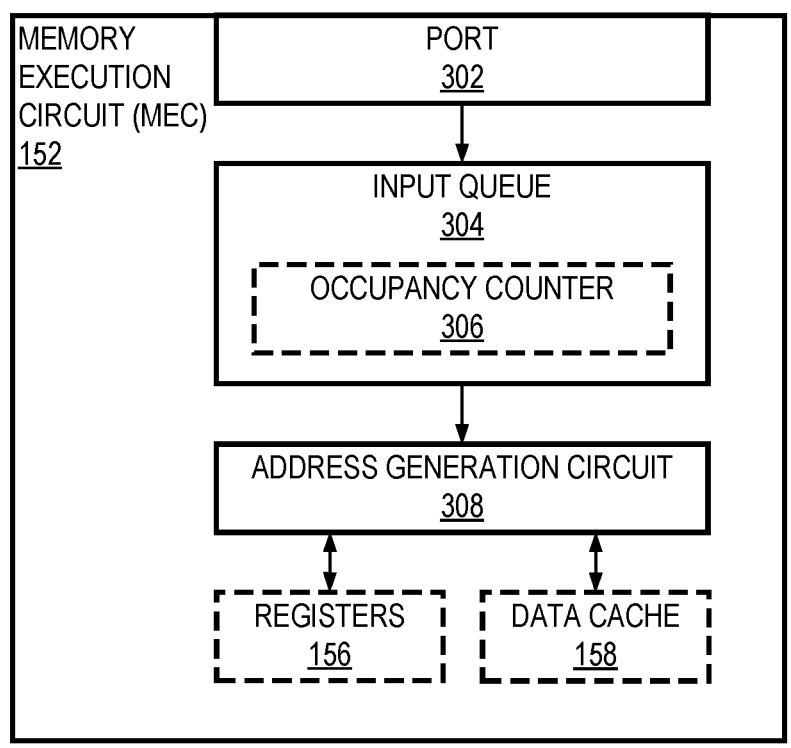
FIG. 3 illustrates an example memory execution circuit according to embodiments of the disclosure.

FIG. 3 illustrates an example memory execution circuit 152 (e.g., as an instance of execution circuits 152A, 152B, and/or 152C in FIG. 1) according to embodiments of the disclosure. Memory execution circuit 152 includes a (e.g., single) port 302 to receive one (or more) micro-operations to be executed by execution circuitry (e.g., address generation circuit 308), e.g., and a coupling to register(s) 156 and/or data cache 158. In certain embodiments, memory execution circuit 152 includes an input queue 304 to store one or more micro-operations that are waiting to be executed, e.g., and an occupancy counter 306 to indicate occupancy (or vacancy) within input queue 304.

Figure 4:
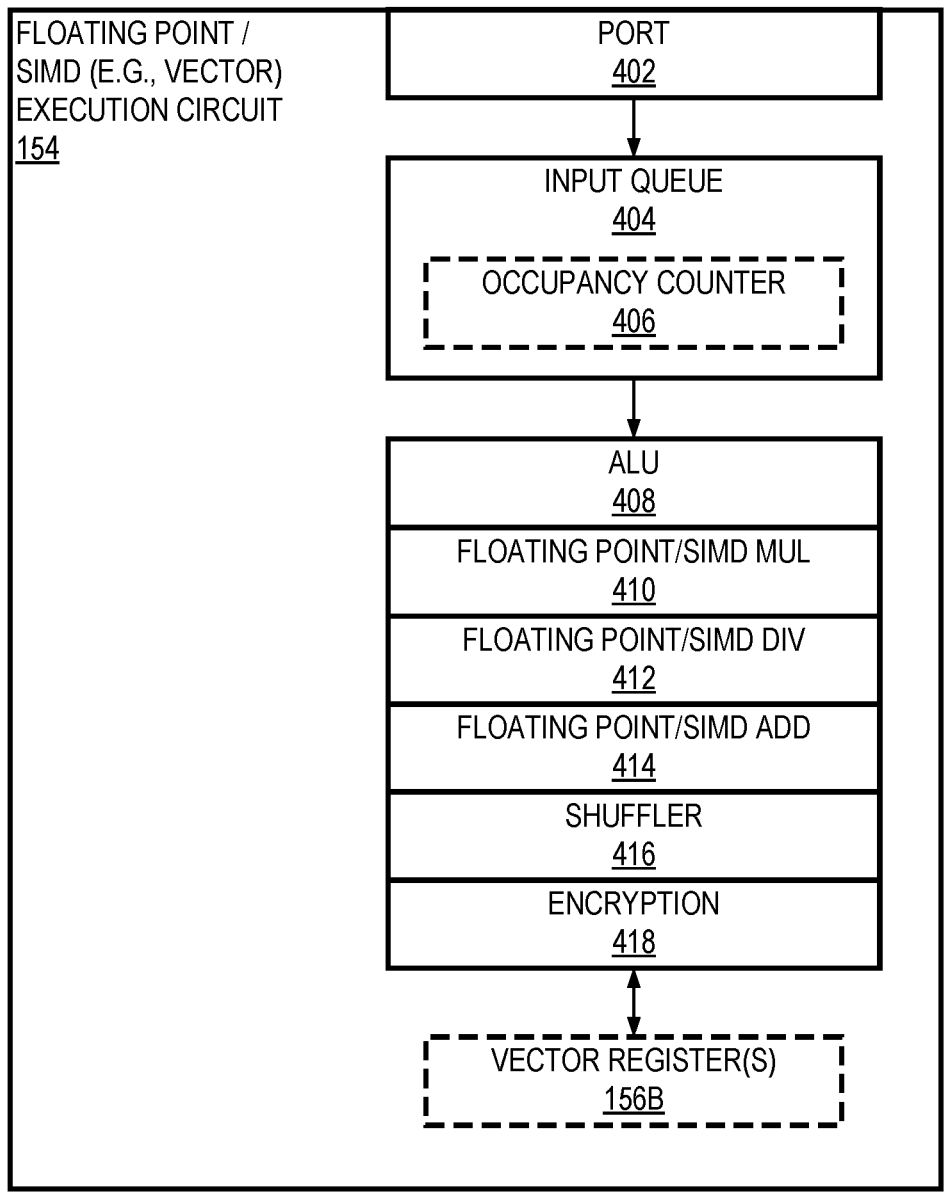
FIG. 4 illustrates an example floating point/single instruction, multiple data (SIMD) execution circuit according to embodiments of the disclosure.

FIG. 4 illustrates an example floating point/SIMD execution circuit 154 (e.g., as an instance of execution circuits 154A, 154B, and/or 154C in FIG. 1) according to embodiments of the disclosure. Floating point/SIMD execution circuit 154 includes a (e.g., single) port 402 to receive one (or more) micro-operations to be executed by execution circuitry (e.g., arithmetic logic unit (ALU) 408, floating point and/or SIMD multiplier 410, floating point and/or SIMD divider 412, floating point and/or SIMD adder 414, shuffler 416, and/or encryption (e.g., engine) 418), e.g., and a coupling to vector register(s) 156B. In certain embodiments, floating point/SIMD execution circuit 154 includes an input queue 404 to store one or more micro-operations that are waiting to be executed, e.g., and an occupancy counter 406 to indicate occupancy (or vacancy) within input queue 404.

In certain embodiments, a floating point format is a sixteen bit wide Institute of Electrical and Electronics Engineers (IEEE) (e.g., IEEE 754 standard) half-precision binary floating-point format (IEEE float16) having a sign field (one bit wide), an exponent field (five bits wide), and a mantissa (significand precision) field (eleven bits implicitly stored, i.e., ten bits wide explicitly stored). In certain embodiments, a floating point format is a sixteen bit wide, brain floating point format (bfloat16) having a sign field (one bit wide), an exponent field (eight bits wide), and a mantissa (significand precision) field (eight bits implicitly stored, i.e., seven bits wide explicitly stored). In certain embodiments, mantissa (significand precision) field is presumed to have an implicit leading bit with value of one, unless the exponent field is stored with all zeros. In certain embodiments, a floating point format is a thirty-two bit wide floating-point format, e.g., binary32 (according to an IEEE standard), which is sometimes referred to as "single-precision" or "fp32", e.g., having a sign field (one bit wide), an exponent field (eight bits wide), and a mantissa (significand precision) field (twenty four bits implicitly stored, i.e., twenty three bits wide explicitly stored).

Figure 5:
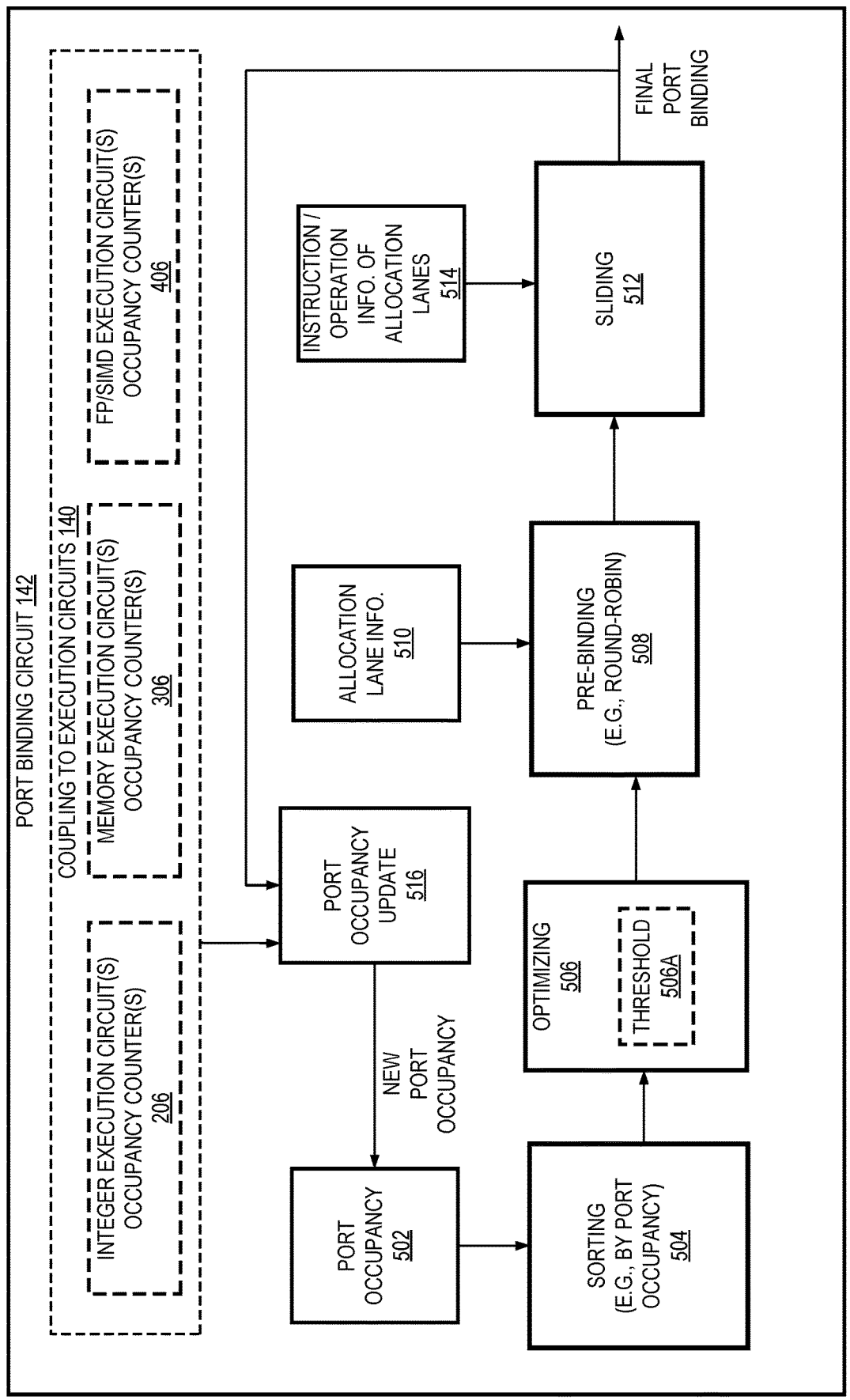
FIG. 5 illustrates a port binding circuit according to embodiments of the disclosure.

FIG. 5 illustrates a port binding circuit 142 according to embodiments of the disclosure. In certain embodiments, port binding circuit 142 includes logic circuitry for sorting 504, optimizing 506, pre-binding 508, and sliding 512 to generate a final port binding.

In certain embodiments, port binding circuit 142 is to balance micro-operations (μops) among the same type of execution ports. In one embodiment, port binding circuit 142 biases binding towards less occupied ports as compared to more occupied ports, for example, by using port occupancy information (e.g., from one or more occupancy counters of execution circuits), sorting 504 based on occupancy (e.g., including masking a port(s) out conditionally or binding all allocation lanes to one port) (e.g., including non-full width SIMD (e.g., vector) support which can execute parallelly, pre-binding 508 (e.g., according to a circular order (e.g., round robin)) for pre-assignment of allocation lane to a port using sorted order, and sliding 512 (e.g., sliding pre-binding order for the different type of operation (e.g., micro-operation)).

In certain embodiments, port binding circuit includes port occupancy 502, e.g., indicating the port occupancy (e.g., the values from a corresponding occupancy counter of each execution circuit). In certain embodiments, there is an imbalance in the occupancy of micro-operations (μops) across a same type of execution ports (e.g., execution circuits). In certain embodiments, the reasons for the imbalance are dependency chain resolution (e.g., dynamic execution behavior) and asymmetric execution circuits (e.g., there may be more ALU's for a certain corresponding port(s) as compared to MUL circuits in other corresponding port(s)). To resolve this imbalance, certain embodiments utilize port binding circuit 142.

In certain embodiments, port binding circuit 142 includes circuitry for sorting 504 (e.g., by port occupancy). In one embodiment, each execution port (e.g., ports P0-P9 in FIG. 1) maintains its own occupancy counter (e.g., as shown in Figures, 2, 3, and 4) which indicates how many micro-operations (μops) are bound to that port (e.g., stored with a respective input queue of the port). In one embodiment, an occupancy counter value that used for sorting may be stale, e.g., so that the implementation is timing friendly and scalable. In certain embodiments, circuitry for sorting 504 uses port occupancy 502 information to generate a sorted (e.g., pre-sorted) list of occupancy, e.g., with a bias towards the less occupied ports first.

Certain examples are discussed herein, and it should be understood that the numbers utilized therein may be examples and not limiting.

In one example in reference to FIG. 1, there are 4 integer ports 144 (P0, P1, P2, P3) and their occupancies are 6, 5, 4, 8 (e.g., bound micro-operations), so the sorted list of occupancy (e.g., in order of increasing occupancy) is P2, P1, P0, P3 (e.g., ports of a single type).

As one option, port binding circuit 142 (e.g., circuitry for optimizing 506) masks out one or more ports conditionally, e.g., such that those port(s) are not bound to an allocation lane (e.g., for this cycle of allocation). For example, when an occupancy imbalance happens among execution ports, certain port(s) are occupied more (e.g., significantly more) than other ports. In such cases, any more binding to that port may make the imbalance issue worse, so the circuitry for optimizing 506 may mask that port out (e.g., exclude it from the sorted list).

In one example in reference to FIG. 1, there are 4 integer ports 144 (P0, P1, P2, P3) and their occupancies are 6, 5, 15, 7 (e.g., bound micro-operations), so the sorted list of occupancy (e.g., in order of increasing occupancy) is P1, P0, P3, P2 (e.g., ports of a single type). However, as the occupancy ("15") of P2 is a higher (e.g., significantly higher) than other ports, so P2 is masked out, so the optimized, sorted list of occupancy (e.g., in order of increasing occupancy) is P1, P0, P3. Note, masking out may depend on a particular core's implementation. In certain embodiments, any port having an occupancy above a threshold 506A (e.g., threshold occupancy) is masked out, e.g., if the threshold was 8 in the above example, port P2 is masked out. In certain embodiments, a single port having a maximum occupancy of a plurality of ports is masked out, e.g., port P2 is masked out as it has the maximum occupancy of those ports (e.g., ports of a single type).

As another option, port binding circuit 142 (e.g., circuitry for optimizing 506) masks out all but one port, e.g., such that those other port(s) are not bound to an allocation lane (e.g., for this cycle of allocation). For example, when occupancy of one port is significantly lower than other ports. In such cases, the circuitry for optimizing 506 is to bind all the incoming micro-operations (e.g., on corresponding allocation lanes) to a single port of a plurality of ports (e.g., ports of a single type). In one example in reference to FIG. 1, there are 4 integer ports 144 (P0, P1, P2, P3) and their occupancies are 13, 14, 3, 14 (e.g., bound micro-operations), so the sorted list of occupancy (e.g., in order of increasing occupancy) is P2, P0, P1, P3 (e.g., ports of a single type). However, as the occupancy ("3") of P2 is lower (e.g., much lower) than the other ports, so P1, P2, and P3 are masked out, and all micro-operations (e.g., on corresponding allocation lanes) are bound to P2.

As yet another option, port binding circuit 142 (e.g., circuitry for optimizing 506) allows (e.g., non-full width) SIMD (e.g., vector) instruction (e.g., a plurality of corresponding micro-operations) to execute parallelly. For example, a SIMD-type instruction may be decoded into multiple micro-operations that can be executed parallelly at multiple execution ports. In order to achieve maximum performance by exploiting the parallelism, in certain embodiments port binding circuit 142 (e.g., circuitry for optimizing 506) binds each micro-operation (e.g., as a sub-operation of the instruction) to different execution ports. In certain embodiments, SIMD execution ports are managed separately by port binding circuit 142 (e.g., circuitry for optimizing 506), sorted by occupancy, and that is used for pre-binding. In certain embodiments, the "all to one port" optimization above is not applied for SIMD instructions, e.g., to prevent multiple micro-operations of a SIMD instruction (e.g., sub-operations of that instruction) from being bound to a same port. In one example in reference to FIG. 1, there are 3 SIMD ports 148 (P7, P8, P9) that are ordered P8, P7, P9 by occupancy and a single SIMD-type of instruction is 2 micro-operations (e.g., 2 sub-operations), such that the first of the two micro-operations (e.g., sub-operations) is bound to P8 and the second of the two micro-operations (e.g., sub-operations) is bound to the next (e.g., next least occupied) port which is P7. By binding two micro-operations (e.g., sub-operations) of a single instruction to different ports, both micro-operations (e.g., sub-operations) achieve parallel execution opportunity.

Figure 6:
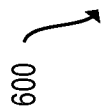
FIG. 6 illustrates a pre-binding mapping of ports to allocation lanes according to embodiments of the disclosure.

In certain embodiments, after the sorted list(s) of occupancy (e.g., for each type of port) is generated, circuitry for pre-binding 508 is executed to pre-bind allocation lanes (e.g., allocation lanes 136 in FIG. 1, shown as four, but any one or plurality are possible) based on the allocation lane information 510 (e.g., information indicating the number of allocation lanes) to certain ports, e.g., statically pre-bind each allocation lane as shown in FIG. 6. In case that the allocation width is larger than the number of execution ports in the sorted order, then sorted order starts from the beginning again (e.g., as another round-robin) to finish pre-binding for all allocation lanes.

FIG. 6 illustrates a pre-binding mapping 600 of ports 604 to allocation lanes 602 according to embodiments of the disclosure. For example, if the allocation width is 6 and the sorted order (e.g., sorted list of occupancy) is P2, P0, P1, P3, the pre-binding mapping is of lane 0 to P2, lane 1 to P0, lane 2 to P2, lane 3 to P3, and, in circular order, starting over with lane 4 to P2, lane 5 to P0, etc. Such pre-binding may be done for each type of ports (e.g., shown here for integer ports P0 to P3 in FIG. 1) or once for all types of ports (e.g., ports P0 to P9 in FIG. 1).

In certain embodiments, the pre-binding does not consider the operation type (e.g., for the operation coming in on an allocation lane) yet, for example, the operation types can be different types (e.g., and are not required to be all the same type).

In certain embodiments, port binding circuit 142 includes circuitry for sliding 512 (e.g., based on instruction/operation information 514 from allocation lanes). In one embodiment, information 514 indicates a type (e.g., integer, memory, floating point, SIMD, etc.) for each incoming micro-operation (e.g., for each lane). In embodiments where pre-binding does not consider operation type of each allocation lane, so a pre-bound port may not be capable of executing the micro-operation incoming from its pre-bound allocation lane. For example, a pre-binding mapping may include a mapping of a memory type of micro-operation from an allocation lane to a port that is not capable of memory operations (e.g., a port of an integer execution circuit). Certain embodiments herein allow for the sliding of the pre-binding order to the next (e.g., in physical lane order, but not sorted) allocation lane, e.g., where the sliding continues until it meets proper type of operation (or until all ports are attempted for a match).

In certain embodiments, sliding happens because the pre-binding (e.g., mapping) is laid out assuming all (e.g., six as one example) allocation lanes have a same type of micro-operation on each of them (e.g., one of integer, memory, floating point, or SIMD) (e.g., assuming a six wide allocation), e.g., and thus there is one copy (e.g., each type has its own) of pre-binding per allocation lane. For example, where during allocation, when there is a type mismatch, the pre-binding is slid for the mismatched type so as to not lose the pre-binding information in certain embodiments.

In certain embodiments, there is one pre-binding (e.g., mapping) for each type of multiple types. For example, if there are three different types of operations (e.g., integer, memory, and floating point), then there are three pre-bindings (one per type) in certain embodiments. In certain embodiments, the sliding for each pre-binding (e.g., mapping) is maintained independently.

In certain embodiments, circuitry for sliding 512 performs a sliding for each type of port, e.g., for a same list of lanes.

Figure 7:
FIG. 7 illustrates sliding of pre-binding mapping of a first set of (e.g., integer execution circuit) ports to allocation lanes into a final (e.g., actual) mapping according to embodiments of the disclosure.

FIG. 7 illustrates sliding 700 of pre-binding mapping 706 of a first set of (e.g., integer execution circuit) ports (e.g., ports P0 to P3 in FIG. 1) to allocation lanes 702 into a final (e.g., actual) mapping 708 according to embodiments of the disclosure. In one example, the ports being bound are integer ports (e.g., for integer execution units) and in the sorted order of P2, P0, P1, P3, circuitry for sliding 512 checks the binding of allocation lane 0 to port P2 from pre-binding 706 and determines that allocation lane 0 has a micro-operation (μop) 704 of a same type (e.g., integer type) (e.g., as indicated by a field of the micro-operation) as the target port type (e.g., integer port here) of P2, and thus does not slide (e.g., the actual binding 708 matches the pre-binding 706 for that lane). In the depicted example, circuitry for sliding 512 checks the binding of allocation lane 1 to P0 from pre-binding 706 and determines that allocation lane 1 has a micro-operation (μop) 704 of a different type (e.g., floating point (FP) type) than the target port type (e.g., integer port here) P0 from the pre-binding 706, and thus lane 2 is attempted to be slid to P0, and this succeeds because allocation lane 2 has a micro-operation (μop) 704 of a same type (e.g., integer type) as the target port type (e.g., integer port here) of P0. In the depicted example, circuitry for sliding 512 checks the binding of next allocation lane 3 to next port P1 from pre-binding 706 and determines that allocation lane 3 has a micro-operation (μop) 704 of a different type (e.g., memory (MEC) type) than the target port type (e.g., integer port here) P1 from the pre-binding 706, and thus lane 4 is attempted to be slid to P1, and this succeeds because allocation lane 4 has a micro-operation (μop) of a same type (e.g., integer type) as the target port type (e.g., integer port here) of P1. In the depicted example, circuitry for sliding 512 checks the binding of next allocation lane 5 to next port P3 from pre-binding 706 and determines that allocation lane 5 has a micro-operation (μop) of a same type (e.g., integer type) as the target port type (e.g., integer port here) of P3, and thus does not slide further (e.g., the actual binding 708 does not match the pre-binding 706 for that lane as sliding was performed for previous lanes). For example, and the sliding 700 is complete as all of the lanes have been analyzed.

FIG. 8 illustrates sliding 800 of pre-binding mapping 806 of a second set of (e.g., memory execution circuit) ports (e.g., ports P4-P6) to allocation lanes 802 into a final (e.g., actual) mapping 808 according to embodiments of the disclosure. In one example, the ports being bound are memory ports (e.g., for memory execution units) and in the sorted order of P6, P4, P5, circuitry for sliding 512 checks the binding of allocation lane 0 to port P6 from pre-binding 806 and determines that allocation lane 0 has a micro-operation (μop) 804 of a different type (e.g., integer type) (e.g., as indicated by a field of the micro-operation) than the target port type (e.g., memory port here) P6 from the pre-binding 806, and lane 1 is attempted to be slid to P6, and this fails because allocation lane 1 has a micro-operation (μop) 804 of a different type (e.g., floating point (FP) type) than the target port type (e.g., memory port here) of P6, and lane 2 is attempted to be slid to P6, and this fails because allocation lane 2 has a micro-operation (μop) 804 of a different type (e.g., integer type) than the target port type (e.g., memory port here) of P6, and thus lane 3 is attempted to be slid to P6, and this succeeds because allocation lane 3 has a micro-operation (μop) of a same type (e.g., memory type) as the target port type (e.g., memory port here) of P6. In the depicted example, circuitry for sliding 512 checks the binding of next allocation lane 4 to next port P4 from pre-binding 806 and determines that allocation lane 4 has a micro-operation (μop) of a different type (e.g., integer type) than the target port type (e.g., memory port here) P4 from the pre-binding 806, and lane 5 is attempted to be slid to P4, and this fails because allocation lane 5 has a micro-operation (µop) 804 of a different type (e.g., integer type) than the target port type (e.g., memory port here) of P4. For example, and the sliding 800 is complete as all of the lanes have been analyzed.

Figure 9:
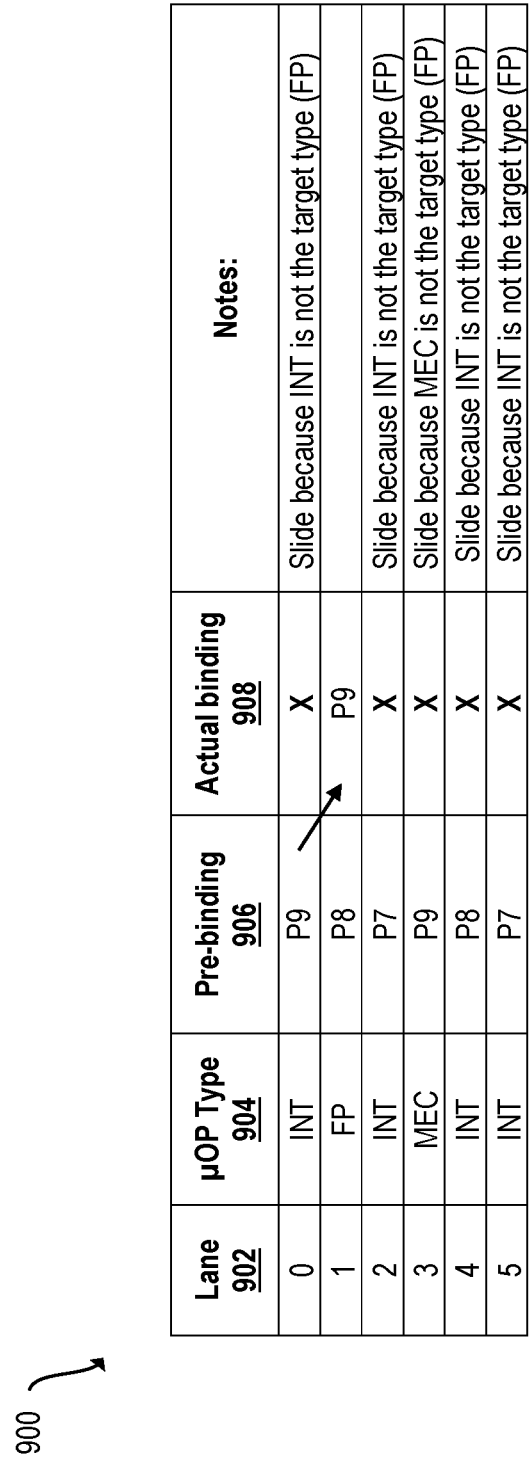
FIG. 9 illustrates sliding of pre-binding mapping of a third set of (e.g., floating point execution circuit) ports to allocation lanes into a final (e.g., actual) mapping according to embodiments of the disclosure.

FIG. 9 illustrates sliding of pre-binding mapping 906 of a third set of (e.g., floating point execution circuit) ports to allocation lanes 902 into a final (e.g., actual) mapping 908 according to embodiments of the disclosure. In one example, the ports being bound are floating point ports (e.g., for floating point execution units) and in the sorted order of P9, P8, P7, circuitry for sliding 512 checks the binding of allocation lane 0 to port P9 from pre-binding 906 and determines that allocation lane 0 has a micro-operation (µop) 904 of a different type (e.g., integer type) (e.g., as indicated by a field of the micro-operation) than the target port type (e.g., floating point port here) P9 from the pre-binding 906, and lane 1 is attempted to be slid to P9, and this succeeds because allocation lane 1 has a micro-operation (µop) of a same type (e.g., floating-point type) as the target port type (e.g., floating point port here) of P9, and next lane 2 is attempted to be slid to next port P8 from the pre-binding 906, and this fails because allocation lane 2 has a micro-operation (µop) 904 of a different type (e.g., integer type) than the target port type (e.g., floating port here) of P8. In the depicted example, circuitry for sliding 512 checks the binding of next allocation lane 3 to port P8 from pre-binding 906 and determines that allocation lane 3 has a micro-operation (µop) of a different type (e.g., memory type) than the target port type (e.g., floating point port here) P8 from the pre-binding 906, and lane 4 is attempted to be slid to P8, and this fails because allocation lane 4 has a micro-operation (µop) 904 of a different type (e.g., integer type) than the target port type (e.g., floating point port here) of P8. In the depicted example, circuitry for sliding 512 checks the binding of next allocation lane 5 to port P8 from pre-binding 906 and determines that allocation lane 5 has a micro-operation (µop) of a different type (e.g., integer type) than the target port type (e.g., floating point port here) P8 from the pre-binding 906, and this fails because allocation lane 5 has a micro-operation (µop) 904 of a different type (e.g., integer type) than the target port type (e.g., floating point port here) of P8. For example, and the sliding 900 is complete as all of the lanes have been analyzed.

Turning again to FIG. 5, the updated mapping(s) may then be used as the final binding(s), for example, and the corresponding micro-operations sent from allocation lane(s) to input port(s) based on those mapping(s), e.g., actual binding 708 from FIG. 7 for integer ports 144 in FIG. 1, actual binding 808 from FIG. 8 for memory ports 146 in FIG. 1, and actual binding 908 from FIG. 9 for floating point (or SIMD) ports 148 in FIG. 1. In certain embodiments, port binding circuit 142 includes circuitry for port occupancy update 516, e.g., to update the port occupancy 502 based on this updated port binding. In certain embodiments, the circuitry for port occupancy update 516 is to update the port occupancy 502 based on the occupancy of the execution circuits (e.g., execution circuits 140 in FIG. 1) (e.g., additionally or alternatively to updating the port occupancy 502 based on the updated port binding from circuitry for sliding 512). In one embodiment, the circuitry for port occupancy update 516 is to update the port occupancy 502 based on the occupancy counters from the execution circuits (e.g., one or more occupancy counters 206 for one or more integer execution circuit(s), one or more occupancy counters 306 for one or more memory execution circuit(s), and one or more occupancy counters 406 for one or more floating point/SIMD execution circuit(s)).

Figure 10:
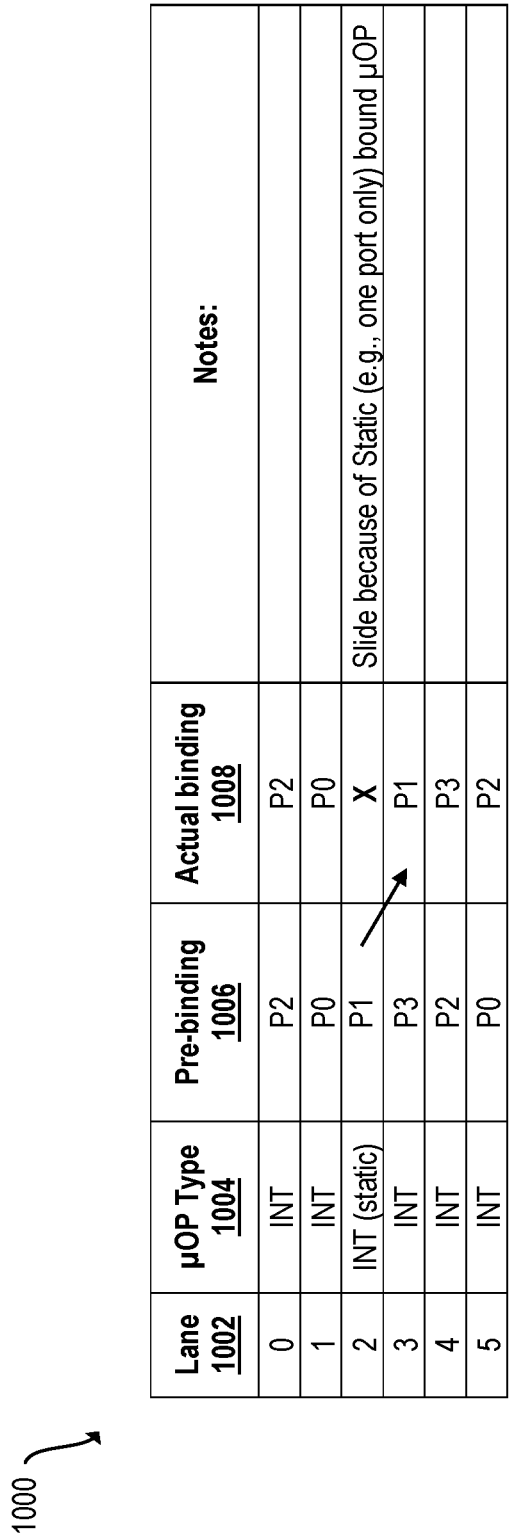
FIG. 10 illustrates sliding of pre-binding mapping of a set of ports to allocation lanes into a final (e.g., actual) mapping with a statically bound micro-operation according to embodiments of the disclosure.

FIG. 10 illustrates sliding 1000 of pre-binding mapping 1006 of a set of ports to allocation lanes 1002 into a final (e.g., actual) mapping 1008 with a statically bound micro-operation according to embodiments of the disclosure. In certain embodiments, sliding is also applied to a micro-operation that is statically bound to a single port, e.g., even though it is the same type of operation and thus static binding is treated as an exceptional case.

In one example, the ports being bound are integer ports (e.g., for integer execution units) and in the sorted order of P2, P0, P1, P3, circuitry for sliding 512 checks the binding of allocation lane 0 to port P2 from pre-binding 1006 and determines that allocation lane 0 has a micro-operation (µop) 1004 of a same type (e.g., integer type) as the target port type (e.g., integer port here) of P2, and thus does not slide (e.g., the actual binding 1008 matches the pre-binding 1006 for that lane). In the depicted example, circuitry for sliding 512 checks the binding of allocation lane 1 to port P0 from pre-binding 1006 and determines that allocation lane 1 has a micro-operation (µop) 1004 of a same type (e.g., integer type) as the target port type (e.g., integer port here) of P0, and thus does not slide (e.g., the actual binding 1008 matches the pre-binding 1006 for that lane). In the depicted example, circuitry for sliding 512 checks the binding of allocation lane 2 to P1 from pre-binding 1006 and determines that allocation lane 1 has a micro-operation (µop) 1004 of a same type (e.g., integer type) than the target port type (e.g., integer port here) P1 from the pre-binding 1006, but that micro-operation is statically bound to a (e.g., different) port, so this fails, and next lane 3 is attempted to be slid to port P1 from the pre-binding 906, and this succeeds because allocation lane 3 has a micro-operation (µop) 904 of a same type (e.g., integer type) than the target port type (e.g., integer here) of P1. In the depicted example, circuitry for sliding 512 checks the binding of next allocation lane 4 to next port P3 from pre-binding 1006 and determines that allocation lane 4 has a micro-operation (µop) 1004 of a same type (e.g., integer type) as the target port type (e.g., integer port here) of P3, and thus does not further slide (e.g., the actual binding 1008 does not match the pre-binding 1006 for that lane as sliding was performed for previous lane). In the depicted example, circuitry for sliding 512 checks the binding of next allocation lane 5 to next port P2 (e.g., wrapping around) from pre-binding 1006 and determines that allocation lane 5 has a micro-operation (µop) 1004 of a same type (e.g., integer type) as the target port type (e.g., integer port here) of P2, and thus does not further slide (e.g., the actual binding 1008 does not match the pre-binding 1006 for that lane as sliding was performed for previous lane). For example, and the sliding 1000 is complete as all of the lanes have been analyzed.

FIG. 11 is a flow diagram illustrating operations 1100 for binding ports of execution circuits to allocation lanes according to embodiments of the disclosure. Some or all of the operations 1100 (or other processes described herein, or variations, and/or combinations thereof) are performed under the control of an allocation circuit (e.g., port binding circuit thereof).

The operations 1100 include, at block 1102, decoding instructions into sets of one or more micro-operations with one or more decoder circuits of a processor comprising a plurality of different types of execution circuits (e.g., in parallel) that each comprise a respective input port and a respective input queue. The operations 1100 further include, at block 1104, receiving an input of micro-operations on a plurality of allocation lanes of an allocation circuit of the processor. The operations 1100 further include, at block 1106, generating, by the allocation circuit, a sorted list of occupancy of the input queues of each input port. The operations 1100 further include, at block 1108, generating, by the allocation circuit, a pre-binding mapping of the input ports of the plurality of different types of execution circuits to the plurality of allocation lanes in a circular order according to the sorted list. The operations 1100 further include, at block 1110, sliding, by the allocation circuit when a type of micro-operation from an allocation lane does not match a type of execution circuit of an input port in the pre-binding mapping, the pre-binding mapping so that the input port maps to a next allocation lane having a matching type of micro-operation to generate a final mapping of the input ports of the plurality of different types of execution circuits to the plurality of allocation lanes. The operations 1100 further include, at block 1112, binding, by the allocation circuit, the input ports of the plurality of different types of execution circuits to the plurality of allocation lanes according to the final mapping.

Exemplary architectures, systems, etc. that the above may be used in are detailed below.

At least some embodiments of the disclosed technologies can be described in view of the following examples:

Example 1. A hardware processor core comprising:
a decoder circuit to decode instructions into sets of one or more micro-operations; an instruction decode queue to store the sets of one or more micro-operations;
a plurality of different types of execution circuits that each comprise a respective input port and a respective input queue; and
an allocation circuit comprising a plurality of allocation lanes coupled to the instruction decode queue and to the input ports of the plurality of different types of execution circuits, wherein the allocation circuit is to, for an input of micro-operations on the plurality of allocation lanes, generate a sorted list of occupancy of the input queues of each input port, generate a pre-binding mapping of the input ports of the plurality of different types of execution circuits to the plurality of allocation lanes in a circular order according to the sorted list, when a type of micro-operation from an allocation lane does not match a type of execution circuit of an input port in the pre-binding mapping, slide the pre-binding (e.g., one-to-one) mapping so that the input port maps to a next (e.g., in physical order in the core) allocation lane having a matching type of micro-operation to generate a final mapping of the input ports of the plurality of different types of execution circuits to the plurality of allocation lanes, and bind the input ports of the plurality of different types of execution circuits to the plurality of allocation lanes according to the final mapping.

Example 2. The hardware processor core of example 1, wherein the allocation circuit is to remove a port having a most occupied input queue from the pre-binding mapping of the input ports to the plurality of allocation lanes.

Example 3. The hardware processor core of example 1, wherein the allocation circuit is to remove any port having an input queue above a threshold occupancy from the pre-binding mapping of the input ports to the plurality of allocation lanes.

Example 4. The hardware processor core of example 1, wherein the allocation circuit is to identify a port having a least occupied input queue, and the pre-binding mapping is to map all of the plurality of allocation lanes to the port having the least occupied input queue.

Example 5. The hardware processor core of example 1, wherein the allocation circuit is to bind a first vector micro-operation of a single instruction to a port of a first vector execution circuit of the plurality of different types of execution circuits and a second vector micro-operation of the single instruction to a port of a second vector execution circuit of the plurality of different types of execution circuits.

Example 6. The hardware processor core of example 1, wherein a number of the plurality of allocation lanes is greater than a number of the input ports.

Example 7. The hardware processor core of example 1, wherein the allocation circuit is to remove a statically bound port from the pre-binding mapping of the input ports to the plurality of allocation lanes.

Example 8. The hardware processor core of example 1, wherein the plurality of different types of execution circuits comprises an integer execution circuit, a memory execution circuit, and a floating point execution circuit.

Example 9. A method comprising:
decoding instructions into sets of one or more micro-operations with one or more decoder circuits of a processor comprising a plurality of different types of execution circuits that each comprise a respective input port and a respective input queue;
receiving an input of micro-operations on a plurality of allocation lanes of an allocation circuit of the processor;
generating, by the allocation circuit, a sorted list of occupancy of the input queues of each input port;
generating, by the allocation circuit, a pre-binding mapping of the input ports of the plurality of different types of execution circuits to the plurality of allocation lanes in a circular order according to the sorted list;
sliding, by the allocation circuit when a type of micro-operation from an allocation lane does not match a type of execution circuit of an input port in the pre-binding mapping, the pre-binding mapping so that the input port maps to a next allocation lane having a matching type of micro-operation to generate a final mapping of the input ports of the plurality of different types of execution circuits to the plurality of allocation lanes; and
binding, by the allocation circuit, the input ports of the plurality of different types of execution circuits to the plurality of allocation lanes according to the final mapping.

Example 10. The method of example 9, further comprising removing, by the allocation circuit, a port having a most occupied input queue from the pre-binding mapping of the input ports to the plurality of allocation lanes.

Example 11. The method of example 9, further comprising removing, by the allocation circuit, any port having an input queue above a threshold occupancy from the pre-binding mapping of the input ports to the plurality of allocation lanes.

Example 12. The method of example 9, further comprising identifying, by the allocation circuit, a port having a least occupied input queue, wherein the pre-binding mapping maps all of the plurality of allocation lanes to the port having the least occupied input queue.

Example 13. The method of example 9, wherein the binding comprises binding a first vector micro-operation of a single instruction to a port of a first vector execution circuit of the plurality of different types of execution circuits and a second vector micro-operation of the single instruction to a port of a second vector execution circuit of the plurality of different types of execution circuits.

Example 14. The method of example 9, wherein a number of the plurality of allocation lanes is greater than a number of the input ports.

Example 15. The method of example 9, further comprising removing, by the allocation circuit, a statically bound port from the pre-binding mapping of the input ports to the plurality of allocation lanes.

Example 16. The method of example 9, wherein the plurality of different types of execution circuits comprises an integer execution circuit, a memory execution circuit, and a floating point execution circuit.

Example 17. A hardware processor core comprising:
a decoder circuit to decode instructions into sets of one or more micro-operations;
an instruction decode queue to store the sets of one or more micro-operations;
a plurality of different types of execution circuits that each comprise a respective input port and a respective input queue; and
an allocation circuit comprising a plurality of allocation lanes coupled to the instruction decode queue and to the input ports of the plurality of different types of execution circuits, wherein the allocation circuit is to, for an input of micro-operations on the plurality of allocation lanes and for each type of the plurality of different types of execution circuits, generate a sorted list of occupancy of the input queues of each input port, generate a pre-binding mapping of the input ports of the plurality of different types of execution circuits to the plurality of allocation lanes in a circular order according to the sorted list, when a type of micro-operation from an allocation lane does not match a type of execution circuit of an input port in the pre-binding mapping, slide the pre-binding mapping so that the input port maps to a next allocation lane having a matching type of micro-operation to generate a final mapping of the input ports of the plurality of different types of execution circuits to the plurality of allocation lanes, and bind the input ports of the plurality of different types of execution circuits to the plurality of allocation lanes according to the final mappings.

Example 18. The hardware processor core of example 17, wherein the allocation circuit is to, for each type of the plurality of different types of execution circuits, remove a port having a most occupied input queue from the pre-binding mapping of the input ports to the plurality of allocation lanes.

Example 19. The hardware processor core of example 17, wherein the allocation circuit is to, for each type of the plurality of different types of execution circuits, remove any port having an input queue above a threshold occupancy from the pre-binding mapping of the input ports to the plurality of allocation lanes.

Example 20. The hardware processor core of example 17, wherein the allocation circuit is to, for each type of the plurality of different types of execution circuits, identify a port having a least occupied input queue, and the pre-binding mapping is to map all of the plurality of allocation lanes to the port having the least occupied input queue.

Example 21. The hardware processor core of example 17, wherein the allocation circuit is to bind a first vector micro-operation of a single instruction to a port of a first vector execution circuit of the plurality of different types of execution circuits and a second vector micro-operation of the single instruction to a port of a second vector execution circuit of the plurality of different types of execution circuits.

Example 22. The hardware processor core of example 17, wherein a number of the plurality of allocation lanes is greater than a number of the input ports.

Example 23. The hardware processor core of example 17, wherein the allocation circuit is to remove a statically bound port from the pre-binding mappings of the input ports to the plurality of allocation lanes.

Example 24. The hardware processor core of example 17, wherein the plurality of different types of execution circuits comprises an integer execution circuit type, a memory execution circuit type, and a floating point execution circuit type.

In yet another embodiment, an apparatus comprises a data storage device that stores code that when executed by a hardware processor causes the hardware processor to perform any method disclosed herein. An apparatus may be as described in the detailed description. A method may be as described in the detailed description.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, November 2018; and see Intel® Architecture Instruction Set Extensions Programming Reference, October 2018).

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary graphics processors are described next. Followed by exemplary core architectures, and descriptions of exemplary processors and computer architectures.

Exemplary Core Architectures

In-Order and Out-of-Order Core Block Diagram

FIG. 12A is a block diagram illustrating both an exemplary in-order pipeline and an exemplary register renaming, out-of-order issue/execution pipeline according to embodiments of the disclosure. FIG. 12B is a block diagram illustrating both an exemplary embodiment of an in-order architecture core and an exemplary register renaming, out-of-order issue/execution architecture core to be included in a processor according to embodiments of the disclosure. The solid lined boxes in FIGS. 12A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 12A, a processor pipeline 1200 includes a fetch stage 1202, a length decode stage 1204, a decode stage 1206, an allocation stage 1208, a renaming stage 1210, a scheduling (also known as a dispatch or issue) stage 1212, a register read/memory read stage 1214, an execute stage 1216, a write back/memory write stage 1218, an exception handling stage 1222, and a commit stage 1224.

FIG. 12B shows processor core 1290 including a front end unit 1230 coupled to an execution engine unit 1250, and both are coupled to a memory unit 1270. The core 1290 may be a reduced instruction set computing (RISC) core, a complex instruction set computing (CISC) core, a very long instruction word (VLIW) core, or a hybrid or alternative core type. As yet another option, the core 1290 may be a special-purpose core, such as, for example, a network or communication core, compression engine, coprocessor core, general purpose computing graphics processing unit (GPGPU) core, graphics core, or the like.

The front end unit 1230 includes a branch prediction unit 1232 coupled to an instruction cache unit 1234, which is coupled to an instruction translation lookaside buffer (TLB) 1236, which is coupled to an instruction fetch unit 1238, which is coupled to a decode unit 1240. The decode unit 1240 (or decoder or decoder unit) may decode instructions (e.g., macro-instructions), and generate as an output one or more micro-operations, micro-code entry points, micro-instructions, other instructions, or other control signals, which are decoded from, or which otherwise reflect, or are derived from, the original instructions. The decode unit 1240 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1290 includes a microcode ROM or other medium that stores microcode for certain macro-instructions (e.g., in decode unit 1240 or otherwise within the front end unit 1230). The decode unit 1240 is coupled to a rename/allocator unit 1252 in the execution engine unit 1250.

The execution engine unit 1250 includes the rename/allocator unit 1252 coupled to a retirement unit 1254 and a set of one or more scheduler unit(s) 1256. The scheduler unit(s) 1256 represents any number of different schedulers, including reservations stations, central instruction window, etc. The scheduler unit(s) 1256 is coupled to the physical register file(s) unit(s) 1258. Each of the physical register file(s) units 1258 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1258 comprises a vector registers unit, a write mask registers unit, and a scalar registers unit. These register units may provide architectural vector registers, vector mask registers, and general purpose registers. The physical register file(s) unit(s) 1258 is overlapped by the retirement unit 1254 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1254 and the physical register file(s) unit(s) 1258 are coupled to the execution cluster(s) 1260. The execution cluster(s) 1260 includes a set of one or more execution units 1262 and a set of one or more memory access units 1264. The execution units 1262 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1256, physical register file(s) unit(s) 1258, and execution cluster(s) 1260 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1264). It should also be understood that where separate pipelines are used, one or more of these pipelines may be out-of-order issue/execution and the rest in-order.

The set of memory access units 1264 is coupled to the memory unit 1270, which includes a data TLB unit 1272 coupled to a data cache unit 1274 coupled to a level 2 (L2) cache unit 1276. In one exemplary embodiment, the memory access units 1264 may include a load unit, a store address unit, and a store data unit, each of which is coupled to the data TLB unit 1272 in the memory unit 1270. The instruction cache unit 1234 is further coupled to a level 2 (L2) cache unit 1276 in the memory unit 1270. The L2 cache unit 1276 is coupled to one or more other levels of cache and eventually to a main memory.

In certain embodiments, a prefetch circuit 1278 is included to prefetch data, for example, to predict access addresses and bring the data for those addresses into a cache or caches (e.g., from memory 1280).

By way of example, the exemplary register renaming, out-of-order issue/execution core architecture may implement the pipeline 1200 as follows: 1) the instruction fetch 1238 performs the fetch and length decoding stages 1202 and 1204; 2) the decode unit 1240 performs the decode stage 1206; 3) the rename/allocator unit 1252 performs the allocation stage 1208 and renaming stage 1210; 4) the scheduler unit(s) 1256 performs the schedule stage 1212; 5) the physical register file(s) unit(s) 1258 and the memory unit 1270 perform the register read/memory read stage 1214; the execution cluster 1260 perform the execute stage 1216; 6) the memory unit 1270 and the physical register file(s) unit(s) 1258 perform the write back/memory write stage 1218; 7) various units may be involved in the exception handling stage 1222; and 8) the retirement unit 1254 and the physical register file(s) unit(s) 1258 perform the commit stage 1224.

The core 1290 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1290 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyper-Threading technology).

While register renaming is described in the context of out-of-order execution, it should be understood that register renaming may be used in an in-order architecture. While the illustrated embodiment of the processor also includes separate instruction and data cache units 1234/1274 and a shared L2 cache unit 1276, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 13B:
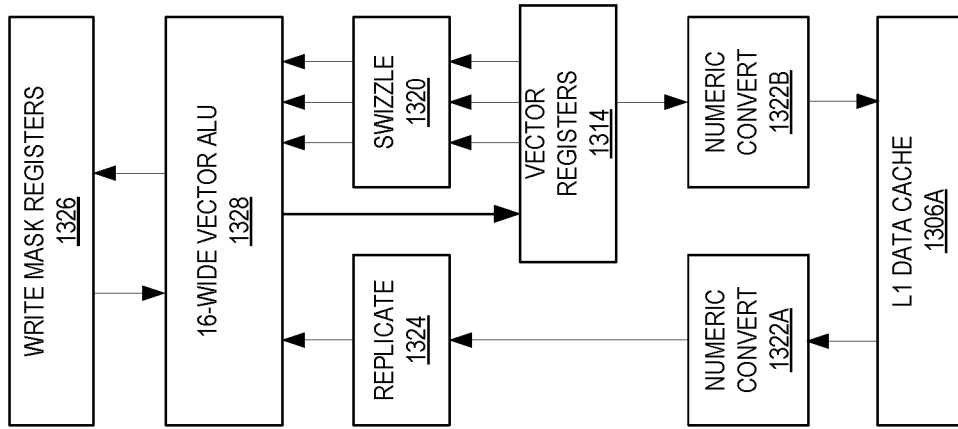
FIG. 13B is an expanded view of part of the processor core in FIG. 13A according to embodiments of the disclosure.
Figure 13A:
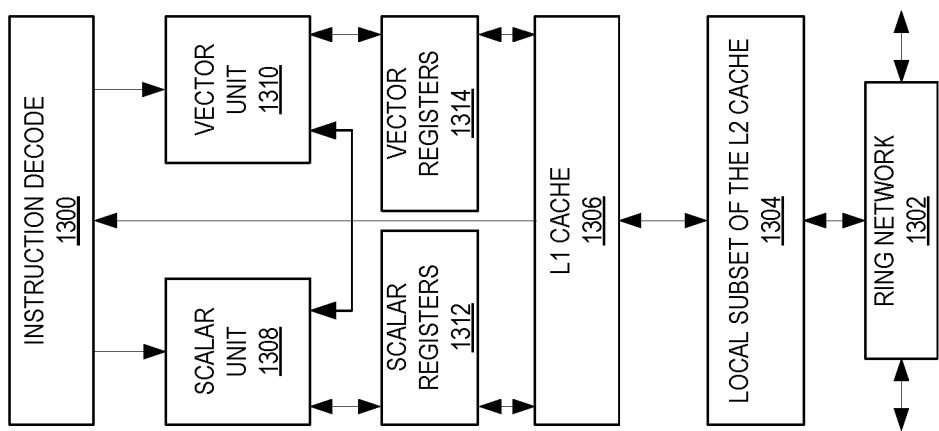
FIG. 13A is a block diagram of a single processor core, along with its connection to the on-die interconnect network and with its local subset of the Level 2 (L2) cache, according to embodiments of the disclosure.

FIGS. 13A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 13A is a block diagram of a single processor core, along with its connection to the on-die interconnect network 1302 and with its local subset of the Level 2 (L2) cache 1304, according to embodiments of the disclosure. In one embodiment, an instruction decode unit 1300 supports the x86 instruction set with a packed data instruction set extension. An L1 cache 1306 allows low-latency accesses to cache memory into the scalar and vector units. While in one embodiment (to simplify the design), a scalar unit 1308 and a vector unit 1310 use separate register sets (respectively, scalar registers 1312 and vector registers 1314) and data transferred between them is written to memory and then read back in from a level 1 (L1) cache 1306, alternative embodiments of the disclosure may use a different approach (e.g., use a single register set or include a communication path that allow data to be transferred between the two register files without being written and read back).

The local subset of the L2 cache 1304 is part of a global L2 cache that is divided into separate local subsets, one per processor core. Each processor core has a direct access path to its own local subset of the L2 cache 1304. Data read by a processor core is stored in its L2 cache subset 1304 and can be accessed quickly, in parallel with other processor cores accessing their own local L2 cache subsets. Data written by a processor core is stored in its own L2 cache subset 1304 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 13B is an expanded view of part of the processor core in FIG. 13A according to embodiments of the disclosure. FIG. 13B includes an L1 data cache 1306A part of the L1 cache 1304, as well as more detail regarding the vector unit 1310 and the vector registers 1314. Specifically, the vector unit 1310 is a 16-wide vector processing unit (VPU) (see the 16-wide ALU 1328), which executes one or more of integer, single-precision float, and double-precision float instructions. The VPU supports swizzling the register inputs with swizzle unit 1320, numeric conversion with numeric convert units 1322A-B, and replication with replication unit 1324 on the memory input. Write mask registers 1326 allow predicating resulting vector writes.

Figure 14:
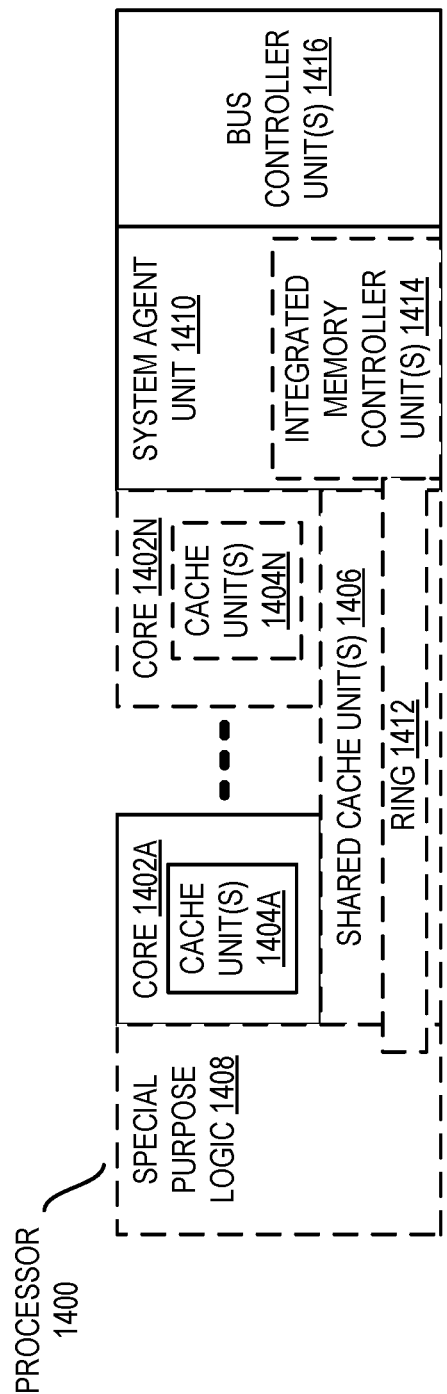
FIG. 14 is a block diagram of a processor that may have more than one core, may have an integrated memory controller, and may have integrated graphics according to embodiments of the disclosure.

FIG. 14 is a block diagram of a processor 1400 that may have more than one core, may have an integrated memory controller, and may have integrated graphics according to embodiments of the disclosure. The solid lined boxes in FIG. 14 illustrate a processor 1400 with a single core 1402A, a system agent 1410, a set of one or more bus controller units 1416, while the optional addition of the dashed lined boxes illustrates an alternative processor 1400 with multiple cores 1402A-N, a set of one or more integrated memory controller unit(s) 1414 in the system agent unit 1410, and special purpose logic 1408.

Thus, different implementations of the processor 1400 may include: 1) a CPU with the special purpose logic 1408 being integrated graphics and/or scientific (throughput) logic (which may include one or more cores), and the cores 1402A-N being one or more general purpose cores (e.g., general purpose in-order cores, general purpose out-of-order cores, a combination of the two); 2) a coprocessor with the cores 1402A-N being a large number of special purpose cores intended primarily for graphics and/or scientific (throughput); and 3) a coprocessor with the cores 1402A-N being a large number of general purpose in-order cores. Thus, the processor 1400 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1400 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1406, and external memory (not shown) coupled to the set of integrated memory controller units 1414. The set of shared cache units 1406 may include one or more mid-level caches, such as level 2 (L2), level 3 (L3), level 4 (L4), or other levels of cache, a last level cache (LLC), and/or combinations thereof. While in one embodiment a ring based interconnect unit 1412 interconnects the integrated graphics logic 1408, the set of shared cache units 1406, and the system agent unit 1410/integrated memory controller unit(s) 1414, alternative embodiments may use any number of well-known techniques for interconnecting such units. In one embodiment, coherency is maintained between one or more cache units 1406 and cores 1402A-N.

In some embodiments, one or more of the cores 1402A-N are capable of multi-threading. The system agent 1410 includes those components coordinating and operating cores 1402A-N. The system agent unit 1410 may include for example a power control unit (PCU) and a display unit. The PCU may be or include logic and components needed for regulating the power state of the cores 1402A-N and the integrated graphics logic 1408. The display unit is for driving one or more externally connected displays.

The cores 1402A-N may be homogenous or heterogeneous in terms of architecture instruction set; that is, two or more of the cores 1402A-N may be capable of execution the same instruction set, while others may be capable of executing only a subset of that instruction set or a different instruction set.

Exemplary Computer Architectures

FIGS. 15-18 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 15:
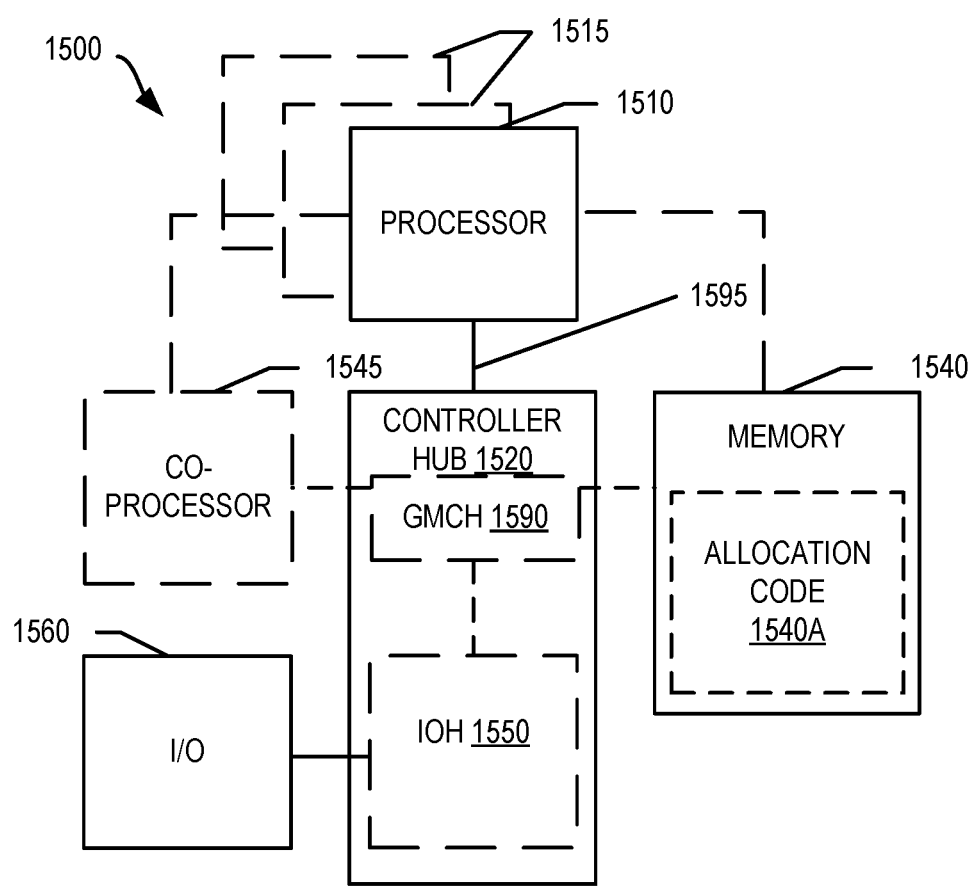
FIG. 15 is a block diagram of a system in accordance with one embodiment of the present disclosure.

Referring now to FIG. 15, shown is a block diagram of a system 1500 in accordance with one embodiment of the present disclosure. The system 1500 may include one or more processors 1510, 1515, which are coupled to a controller hub 1520. In one embodiment the controller hub 1520 includes a graphics memory controller hub (GMCH) 1590 and an Input/Output Hub (IOH) 1550 (which may be on separate chips); the GMCH 1590 includes memory and graphics controllers to which are coupled memory 1540 and a coprocessor 1545; the IOH 1550 is couples input/output (I/O) devices 1560 to the GMCH 1590. Alternatively, one or both of the memory and graphics controllers are integrated within the processor (as described herein), the memory 1540 and the coprocessor 1545 are coupled directly to the processor 1510, and the controller hub 1520 in a single chip with the IOH 1550. Memory 1540 may include allocation code 1540A, for example, to store code that when executed causes a processor to perform any method of this disclosure.

The optional nature of additional processors 1515 is denoted in FIG. 15 with broken lines. Each processor 1510, 1515 may include one or more of the processing cores described herein and may be some version of the processor 1400.

The memory 1540 may be, for example, dynamic random access memory (DRAM), phase change memory (PCM), or a combination of the two. For at least one embodiment, the controller hub 1520 communicates with the processor(s) 1510, 1515 via a multi-drop bus, such as a frontside bus (FSB), point-to-point interface such as Quickpath Interconnect (QPI), or similar connection 1595.

In one embodiment, the coprocessor 1545 is a special-purpose processor, such as, for example, a high-throughput MIC processor, a network or communication processor, compression engine, graphics processor, GPGPU, embedded processor, or the like. In one embodiment, controller hub 1520 may include an integrated graphics accelerator.

There can be a variety of differences between the physical resources 1510, 1515 in terms of a spectrum of metrics of merit including architectural, microarchitectural, thermal, power consumption characteristics, and the like.

In one embodiment, the processor 1510 executes instructions that control data processing operations of a general type. Embedded within the instructions may be coprocessor instructions. The processor 1510 recognizes these coprocessor instructions as being of a type that should be executed by the attached coprocessor 1545. Accordingly, the processor 1510 issues these coprocessor instructions (or control signals representing coprocessor instructions) on a coprocessor bus or other interconnect, to coprocessor 1545. Coprocessor(s) 1545 accept and execute the received coprocessor instructions.

Figure 16:
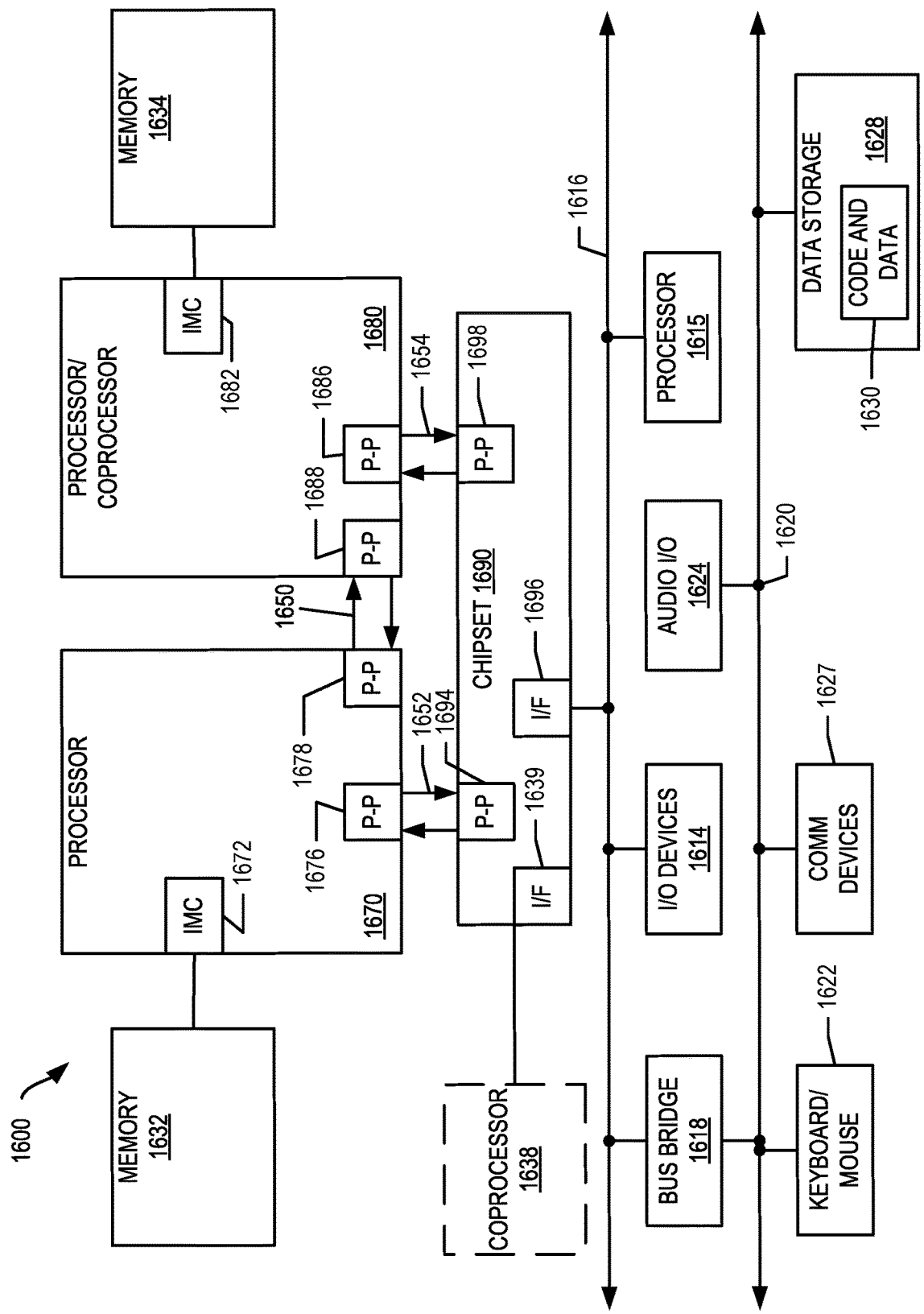
FIG. 16 is a block diagram of a more specific exemplary system in accordance with an embodiment of the present disclosure.

Referring now to FIG. 16, shown is a block diagram of a first more specific exemplary system 1600 in accordance with an embodiment of the present disclosure. As shown in FIG. 16, multiprocessor system 1600 is a point-to-point interconnect system, and includes a first processor 1670 and a second processor 1680 coupled via a point-to-point interconnect 1650. Each of processors 1670 and 1680 may be some version of the processor 1400. In one embodiment of the disclosure, processors 1670 and 1680 are respectively processors 1510 and 1515, while coprocessor 1638 is coprocessor 1545. In another embodiment, processors 1670 and 1680 are respectively processor 1510 coprocessor 1545.

Processors 1670 and 1680 are shown including integrated memory controller (IMC) units 1672 and 1682, respectively. Processor 1670 also includes as part of its bus controller units point-to-point (P-P) interfaces 1676 and 1678; similarly, second processor 1680 includes P-P interfaces 1686 and 1688. Processors 1670, 1680 may exchange information via a point-to-point (P-P) interface 1650 using P-P interface circuits 1678, 1688. As shown in FIG. 16, IMCs 1672 and 1682 couple the processors to respective memories, namely a memory 1632 and a memory 1634, which may be portions of main memory locally attached to the respective processors.

Processors 1670, 1680 may each exchange information with a chipset 1690 via individual P-P interfaces 1652, 1654 using point to point interface circuits 1676, 1694, 1686, 1698. Chipset 1690 may optionally exchange information with the coprocessor 1638 via a high-performance interface 1639. In one embodiment, the coprocessor 1638 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1690 may be coupled to a first bus 1616 via an interface 1696. In one embodiment, first bus 1616 may be a Peripheral Component Interconnect (PCI) bus, or a bus such as a PCI Express bus or another third generation I/O interconnect bus, although the scope of the present disclosure is not so limited.

As shown in FIG. 16, various I/O devices 1614 may be coupled to first bus 1616, along with a bus bridge 1618 which couples first bus 1616 to a second bus 1620. In one embodiment, one or more additional processor(s) 1615, such as coprocessors, high-throughput MIC processors, GPGPU's, accelerators (such as, e.g., graphics accelerators or digital signal processing (DSP) units), field programmable gate arrays, or any other processor, are coupled to first bus 1616. In one embodiment, second bus 1620 may be a low pin count (LPC) bus. Various devices may be coupled to a second bus 1620 including, for example, a keyboard and/or mouse 1622, communication devices 1627 and a storage unit 1628 such as a disk drive or other mass storage device which may include instructions/code and data 1630, in one embodiment. Further, an audio I/O 1624 may be coupled to the second bus 1620. Note that other architectures are possible. For example, instead of the point-to-point architecture of FIG. 16, a system may implement a multi-drop bus or other such architecture.

Figure 17:
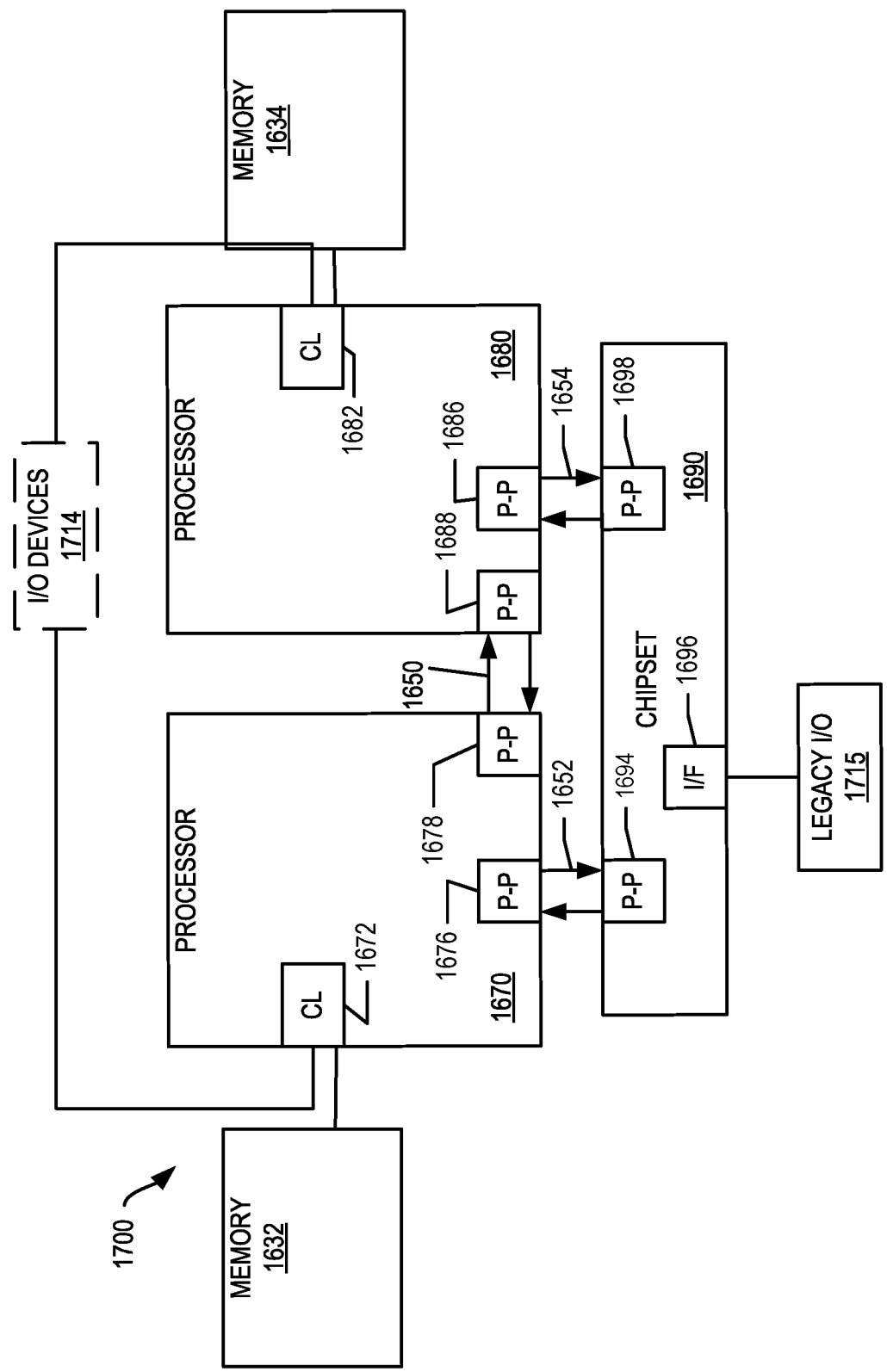
FIG. 17, shown is a block diagram of a second more specific exemplary system in accordance with an embodiment of the present disclosure.

Referring now to FIG. 17, shown is a block diagram of a second more specific exemplary system 1700 in accordance with an embodiment of the present disclosure. Like elements in FIGS. 16 and 17 bear like reference numerals, and certain aspects of FIG. 16 have been omitted from FIG. 17 in order to avoid obscuring other aspects of FIG. 17.

FIG. 17 illustrates that the processors 1670, 1680 may include integrated memory and I/O control logic ("CL") 1672 and 1682, respectively. Thus, the CL 1672, 1682 include integrated memory controller units and include I/O control logic. FIG. 17 illustrates that not only are the memories 1632, 1634 coupled to the CL 1672, 1682, but also that I/O devices 1714 are also coupled to the control logic 1672, 1682. Legacy I/O devices 1715 are coupled to the chipset 1690.

Figure 18:
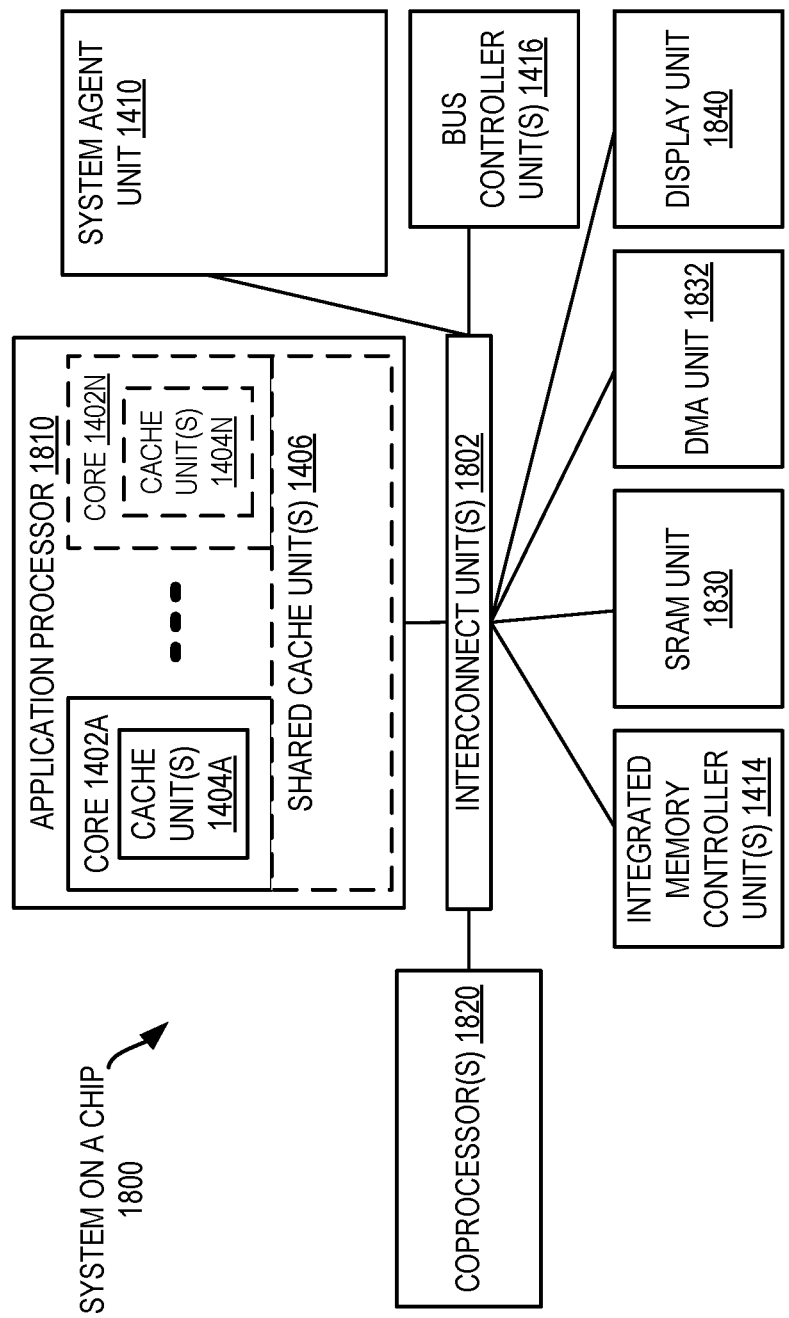
FIG. 18, shown is a block diagram of a system on a chip (SoC) in accordance with an embodiment of the present disclosure.

Referring now to FIG. 18, shown is a block diagram of a SoC 1800 in accordance with an embodiment of the present disclosure. Similar elements in FIG. 14 bear like reference numerals. Also, dashed lined boxes are optional features on more advanced SoCs. In FIG. 18, an interconnect unit(s) 1802 is coupled to: an application processor 1810 which includes a set of one or more cores 1402A-N and shared cache unit(s) 1406; a system agent unit 1410; a bus controller unit(s) 1416; an integrated memory controller unit(s) 1414; a set or one or more coprocessors 1820 which may include integrated graphics logic, an image processor, an audio processor, and a video processor; an static random access memory (SRAM) unit 1830; a direct memory access (DMA) unit 1832; and a display unit 1840 for coupling to one or more external displays. In one embodiment, the coprocessor(s) 1820 include a special-purpose processor, such as, for example, a network or communication processor, compression engine, GPGPU, a high-throughput MIC processor, embedded processor, or the like.

Embodiments (e.g., of the mechanisms) disclosed herein may be implemented in hardware, software, firmware, or a combination of such implementation approaches.

Embodiments of the disclosure may be implemented as computer programs or program code executing on programmable systems comprising at least one processor, a storage system (including volatile and non-volatile memory and/or storage elements), at least one input device, and at least one output device.

Program code, such as code 1630 illustrated in FIG. 16, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (including binary translation, code morphing, etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 19:
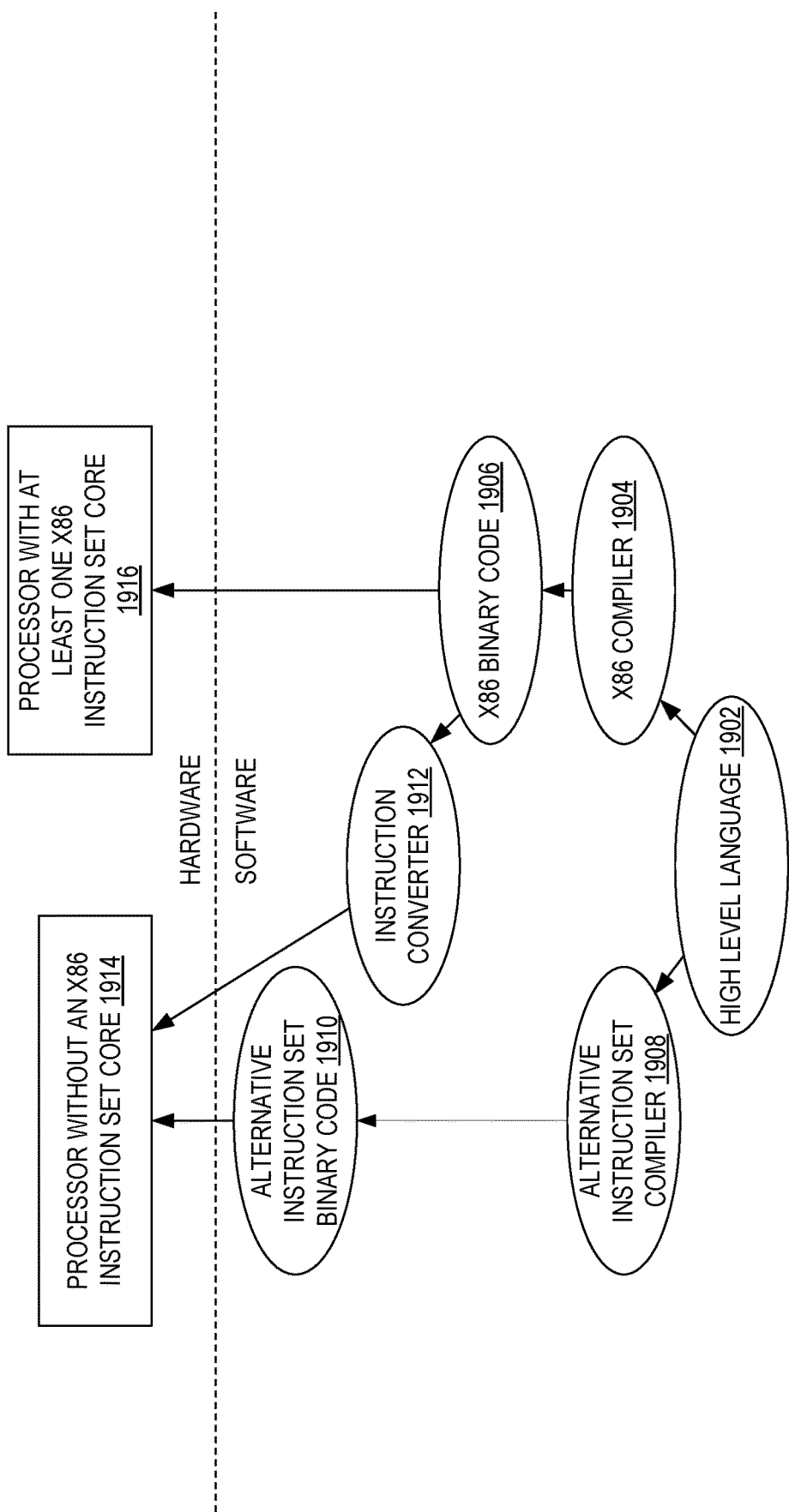
FIG. 19 is a block diagram contrasting the use of a software instruction converter to convert binary instructions in a source instruction set to binary instructions in a target instruction set according to embodiments of the disclosure.

FIG. 19 is a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software, firmware, hardware, or various combinations thereof. FIG. 19 shows a program in a high level language 1902 may be compiled using an x86 compiler 1904 to generate x86 binary code 1906 that may be natively executed by a processor with at least one x86 instruction set core 1916. The processor with at least one x86 instruction set core 1916 represents any processor that can perform substantially the same functions as an Intel® processor with at least one x86 instruction set core by compatibly executing or otherwise processing (1) a substantial portion of the instruction set of the Intel® x86 instruction set core or (2) object code versions of applications or other software targeted to run on an Intel® processor with at least one x86 instruction set core, in order to achieve substantially the same result as an Intel® processor with at least one x86 instruction set core. The x86 compiler 1904 represents a compiler that is operable to generate x86 binary code 1906 (e.g., object code) that can, with or without additional linkage processing, be executed on the processor with at least one x86 instruction set core 1916. Similarly, FIG. 19 shows the program in the high level language 1902 may be compiled using an alternative instruction set compiler 1908 to generate alternative instruction set binary code 1910 that may be natively executed by a processor without at least one x86 instruction set core 1914 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1912 is used to convert the x86 binary code 1906 into code that may be natively executed by the processor without an x86 instruction set core 1914. This converted code is not likely to be the same as the alternative instruction set binary code 1910 because an instruction converter capable of this is difficult to make; however, the converted code will accomplish the general operation and be made up of instructions from the alternative instruction set. Thus, the instruction converter 1912 represents software, firmware, hardware, or a combination thereof that, through emulation, simulation or any other process, allows a processor or other electronic device that does not have an x86 instruction set processor or core to execute the x86 binary code 1906.

What is claimed is:

1. A hardware processor core comprising:
   a decoder circuit to decode instructions into micro-operations;
   an instruction decode queue to store the micro-operations;
   a plurality of different types of execution circuits that each comprise a respective input port and a respective input queue; and
   an allocation circuit comprising a plurality of allocation lanes coupled to the instruction decode queue and to the input ports of the plurality of different types of execution circuits, wherein the allocation circuit is to, for an input of the micro-operations on the plurality of allocation lanes, generate a sorted list of occupancy of the input queues of each input port, generate a pre-binding mapping of the input ports of the plurality of different types of execution circuits to the plurality of allocation lanes in a circular order according to the sorted list, when a type of micro-operation from an allocation lane does not match a type of execution circuit of an input port in the pre-binding mapping, slide the pre-binding mapping so that the input port maps to a next allocation lane having a matching type of micro-operation to generate a final mapping of the input ports of the plurality of different types of execution circuits to the plurality of allocation lanes, and bind the input ports of the plurality of different types of execution circuits to the plurality of allocation lanes according to the final mapping.

2. The hardware processor core of claim 1, wherein the allocation circuit is to remove a port having a most occupied input queue from the pre-binding mapping of the input ports to the plurality of allocation lanes.

3. The hardware processor core of claim 1, wherein the allocation circuit is to remove any port having an input queue above a threshold occupancy from the pre-binding mapping of the input ports to the plurality of allocation lanes.

4. The hardware processor core of claim 1, wherein the allocation circuit is to identify a port having a least occupied input queue, and the pre-binding mapping is to map all of the plurality of allocation lanes to the port having the least occupied input queue.

5. The hardware processor core of claim 1, wherein the allocation circuit is to bind a first vector micro-operation of a single instruction to a port of a first vector execution circuit of the plurality of different types of execution circuits and a second vector micro-operation of the single instruction to a port of a second vector execution circuit of the plurality of different types of execution circuits.

6. The hardware processor core of claim 1, wherein a number of the plurality of allocation lanes is greater than a number of the input ports.

7. The hardware processor core of claim 1, wherein the allocation circuit is to remove a statically bound port from the pre-binding mapping of the input ports to the plurality of allocation lanes.

8. The hardware processor core of claim 1, wherein the plurality of different types of execution circuits comprises an integer execution circuit, a memory execution circuit, and a floating point execution circuit.

9. A method comprising:
   decoding instructions into micro-operations with one or more decoder circuits of a processor comprising a plurality of different types of execution circuits that each comprise a respective input port and a respective input queue;
   receiving an input of the micro-operations on a plurality of allocation lanes of an allocation circuit of the processor;
   generating, by the allocation circuit, a sorted list of occupancy of the input queues of each input port;
   generating, by the allocation circuit, a pre-binding mapping of the input ports of the plurality of different types of execution circuits to the plurality of allocation lanes in a circular order according to the sorted list;
   sliding, by the allocation circuit when a type of micro-operation from an allocation lane does not match a type of execution circuit of an input port in the pre-binding mapping, the pre-binding mapping so that the input port maps to a next allocation lane having a matching type of micro-operation to generate a final mapping of the input ports of the plurality of different types of execution circuits to the plurality of allocation lanes; and binding, by the allocation circuit, the input ports of the plurality of different types of execution circuits to the plurality of allocation lanes according to the final mapping.

10. The method of claim 9, further comprising removing, by the allocation circuit, a port having a most occupied input queue from the pre-binding mapping of the input ports to the plurality of allocation lanes.

11. The method of claim 9, further comprising removing, by the allocation circuit, any port having an input queue above a threshold occupancy from the pre-binding mapping of the input ports to the plurality of allocation lanes.

12. The method of claim 9, further comprising identifying, by the allocation circuit, a port having a least occupied input queue, wherein the pre-binding mapping maps all of the plurality of allocation lanes to the port having the least occupied input queue.

13. The method of claim 9, wherein the binding comprises binding a first vector micro-operation of a single instruction to a port of a first vector execution circuit of the plurality of different types of execution circuits and a second vector micro-operation of the single instruction to a port of a second vector execution circuit of the plurality of different types of execution circuits.

14. The method of claim 9, wherein a number of the plurality of allocation lanes is greater than a number of the input ports.

15. The method of claim 9, further comprising removing, by the allocation circuit, a statically bound port from the pre-binding mapping of the input ports to the plurality of allocation lanes.

16. The method of claim 9, wherein the plurality of different types of execution circuits comprises an integer execution circuit, a memory execution circuit, and a floating point execution circuit.

17. A hardware processor core comprising:
a decoder circuit to decode instructions into micro-operations;
an instruction decode queue to store the micro-operations;
a plurality of different types of execution circuits that each comprise a respective input port and a respective input queue; and
an allocation circuit comprising a plurality of allocation lanes coupled to the instruction decode queue and to the input ports of the plurality of different types of execution circuits, wherein the allocation circuit is to, for an input of the micro-operations on the plurality of allocation lanes and for each type of the plurality of different types of execution circuits, generate a sorted list of occupancy of the input queues of each input port, generate a pre-binding mapping of the input ports of the plurality of different types of execution circuits to the plurality of allocation lanes in a circular order according to the sorted list, when a type of micro-operation from an allocation lane does not match a type of execution circuit of an input port in the pre-binding mapping, slide the pre-binding mapping so that the input port maps to a next allocation lane having a matching type of micro-operation to generate a final mapping of the input ports of the plurality of different types of execution circuits to the plurality of allocation lanes, and bind the input ports of the plurality of different types of execution circuits to the plurality of allocation lanes according to the final mappings.

18. The hardware processor core of claim 17, wherein the allocation circuit is to, for each type of the plurality of different types of execution circuits, remove a port having a most occupied input queue from the pre-binding mapping of the input ports to the plurality of allocation lanes.

19. The hardware processor core of claim 17, wherein the allocation circuit is to, for each type of the plurality of different types of execution circuits, remove any port having an input queue above a threshold occupancy from the pre-binding mapping of the input ports to the plurality of allocation lanes.

20. The hardware processor core of claim 17, wherein the allocation circuit is to, for each type of the plurality of different types of execution circuits, identify a port having a least occupied input queue, and the pre-binding mapping is to map all of the plurality of allocation lanes to the port having the least occupied input queue.

21. The hardware processor core of claim 17, wherein the allocation circuit is to bind a first vector micro-operation of a single instruction to a port of a first vector execution circuit of the plurality of different types of execution circuits and a second vector micro-operation of the single instruction to a port of a second vector execution circuit of the plurality of different types of execution circuits.

22. The hardware processor core of claim 17, wherein a number of the plurality of allocation lanes is greater than a number of the input ports.

23. The hardware processor core of claim 17, wherein the allocation circuit is to remove a statically bound port from the pre-binding mappings of the input ports to the plurality of allocation lanes.

24. The hardware processor core of claim 17, wherein the plurality of different types of execution circuits comprises an integer execution circuit type, a memory execution circuit type, and a floating point execution circuit type.

* * * * *